US010255566B2

(12) United States Patent
Gruber et al.

(10) Patent No.: US 10,255,566 B2
(45) Date of Patent: Apr. 9, 2019

(54) GENERATING AND PROCESSING TASK ITEMS THAT REPRESENT TASKS TO PERFORM

(75) Inventors: Thomas R. Gruber, Emerald Hills, CA (US); Alessandro F. Sabatelli, San Francisco, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 13/251,088

(22) Filed: Sep. 30, 2011

(65) Prior Publication Data

US 2012/0311583 A1 Dec. 6, 2012

Related U.S. Application Data

(60) Provisional application No. 61/493,201, filed on Jun. 3, 2011.

(51) Int. Cl.
*G06Q 10/00* (2012.01)
*G06Q 10/06* (2012.01)
(Continued)

(52) U.S. Cl.
CPC ..... *G06Q 10/06311* (2013.01); *G06Q 10/109* (2013.01); *H04W 4/02* (2013.01); *H04W 4/16* (2013.01)

(58) Field of Classification Search
CPC ......... G06Q 10/06311; G06Q 10/0633; G06Q 10/109; H04W 4/02; H04W 4/16
See application file for complete search history.

(56) References Cited

U.S. PATENT DOCUMENTS 3,704,345 A 11/1972 Coker et al.
3,828,132 A 8/1974 Flanagan et al.
(Continued)

FOREIGN PATENT DOCUMENTS

CH 681573 A5 4/1993
CN 101233741 A 7/2008
(Continued)

OTHER PUBLICATIONS

Alfred App, 2011, http://www.alfredapp.com/, 5 pages.
(Continued)

*Primary Examiner* — Matthew S Gart
*Assistant Examiner* — Stephen S Swartz
(74) *Attorney, Agent, or Firm* — Dentons US LLP

(57) ABSTRACT

Techniques for processing task items are provided. A task item is electronic data that represents a task to be performed, whether manually or automatically. A task item includes one or more details about its corresponding task, such as a description of the task and a location of the task. Specifically, techniques for generating task items, organizing task items, triggering notifications of task items, and consuming task items are described. In one approach, a task item is generated based on input from a user and context of the input. In another approach, different attributes of task items are used to organize the task items intelligently into multiple lists. In another approach, one or more criteria, such as location, are used to determine when to notify a user of a task. In another approach, actions other than generating notifications are enabled or automatically performed, actions such as emailing, calling, and searching.

35 Claims, 21 Drawing Sheets

(51) Int. Cl.
  *H04W 4/02* (2018.01)
  *G06Q 10/10* (2012.01)
  *H04W 4/16* (2009.01)

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,377,303 A | 12/1994 | Firman |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,530,861 A | 6/1996 | Diamant et al. |
| 5,536,902 A | 7/1996 | Serra et al. |
| 5,537,618 A | 7/1996 | Boulton et al. |
| 5,574,823 A | 11/1996 | Hassanein et al. |
| 5,577,164 A | 11/1996 | Kaneko et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |

(56) References Cited

U.S. PATENT DOCUMENTS

| | | |
|---|---|---|
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,777,614 A | 7/1998 | Ando et al. |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,094,649 A | 6/2000 | Bowen et al. |
| 6,088,671 A | 7/2000 | Gould et al. |
| 6,088,731 A | 7/2000 | Kiraly et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,161,084 A | 12/2000 | Messerly et al. |
| 6,173,261 B1 | 1/2001 | Arai et al. |
| 6,173,279 B1 | 1/2001 | Levin et al. |
| 6,177,905 B1 | 1/2001 | Welch |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Belllegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,351 B2 * | 2/2003 | Whitham ............... 701/438 |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,680,675 B1 * | 1/2004 | Suzuki ............... 340/988 |
| 6,684,187 B1 | 1/2004 | Conkie |
| 6,691,064 B2 | 2/2004 | Vroman |
| 6,691,111 B2 | 2/2004 | Lazaridis et al. |

(56) References Cited

U.S. PATENT DOCUMENTS

| | | |
|---|---|---|
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,957,076 B2 * | 10/2005 | Hunzinger ............... 455/456.3 |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,084,758 B1 | 8/2006 | Cole |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,248,900 B2 | 7/2007 | Deeds |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,292,579 B2 | 11/2007 | Morris |
| 7,299,033 B2 | 11/2007 | Kjellberg et al. |
| 7,302,686 B2 * | 11/2007 | Togawa ........................ 718/103 |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,362,738 B2 | 4/2008 | Taube et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,461,043 B2 | 12/2008 | Hess |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,528,713 B2 | 5/2009 | Singh et al. |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,541,940 B2 * | 6/2009 | Upton ........................ 340/686.1 |
| 7,543,232 B2 | 6/2009 | Easton et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,561,069 B2 | 7/2009 | Horstemeyer |
| 7,571,106 B2 | 8/2009 | Cao et al. |
| 7,577,522 B2 | 8/2009 | Rosenberg |
| 7,599,918 B2 | 10/2009 | Shen et al. |
| 7,603,381 B2 | 10/2009 | Burke et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,649,454 B2 * | 1/2010 | Singh et al. ............. 340/539.11 |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |

(56) References Cited

U.S. PATENT DOCUMENTS

| | | | |
|---|---|---|---|
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,818,291 B2 * | 10/2010 | Ferguson et al. ............ 707/609 |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,283 B2 | 2/2011 | Cormier et al. |
| 7,881,936 B2 | 2/2011 | Longé et al. |
| 7,885,844 B1 * | 2/2011 | Cohen et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,857 B2 | 4/2011 | Lau et al. |
| 7,925,525 B2 | 4/2011 | Chin |
| 7,930,168 B2 | 4/2011 | Weng et al. |
| 7,930,197 B2 | 4/2011 | Ozzie et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,015,144 B2 | 9/2011 | Zheng et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,060,824 B2 | 11/2011 | Brownrigg, Jr. et al. |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 * | 11/2011 | Sheshagiri et al. ............ 715/866 |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,122,094 B1 | 2/2012 | Kotab |
| 8,131,557 B2 | 3/2012 | Davis et al. |
| 8,138,912 B2 | 3/2012 | Singh et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,170,790 B2 | 5/2012 | Lee et al. |
| 8,188,856 B2 | 5/2012 | Singh et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,115 B1 | 7/2012 | Nelissen |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,423,288 B2 | 4/2013 | Stahl et al. |
| 8,447,612 B2 | 5/2013 | Gazdzinski |
| 8,489,599 B2 | 7/2013 | Bellotti |
| 8,560,229 B1 | 10/2013 | Park et al. |
| 8,781,456 B2 | 7/2014 | Prociw |
| 9,049,255 B2 | 6/2015 | Macfarlane et al. |
| 2001/0047264 A1 | 11/2001 | Roundtree |
| 2002/0004703 A1 | 1/2002 | Gaspard, II |
| 2002/0032564 A1 | 3/2002 | Ehsani et al. |
| 2002/0046025 A1 | 4/2002 | Hain |
| 2002/0067308 A1 | 6/2002 | Robertson |
| 2002/0069063 A1 | 6/2002 | Buchner et al. |
| 2002/0077817 A1 | 6/2002 | Atal |
| 2002/0086680 A1 | 7/2002 | Hunzinger |
| 2002/0103641 A1 | 8/2002 | Kuo et al. |
| 2002/0154160 A1 | 10/2002 | Hosokawa |
| 2002/0164000 A1 | 11/2002 | Cohen et al. |
| 2002/0198714 A1 | 12/2002 | Zhou |
| 2003/0120494 A1 | 6/2003 | Jost et al. |
| 2003/0140088 A1 * | 7/2003 | Robinson et al. ............ 709/202 |
| 2003/0177046 A1 * | 9/2003 | Socha-Leialoha ................ 705/7 |
| 2003/0212961 A1 | 11/2003 | Soin et al. |
| 2004/0054535 A1 | 3/2004 | Mackie et al. |
| 2004/0054690 A1 | 3/2004 | Hillerbrand et al. |
| 2004/0135701 A1 | 7/2004 | Yasuda et al. |
| 2004/0162741 A1 | 8/2004 | Flaxer et al. |
| 2004/0193420 A1 | 9/2004 | Kennewick et al. |
| 2004/0236778 A1 | 11/2004 | Junqua et al. |
| 2005/0015772 A1 | 1/2005 | Saare et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0108074 A1 | 5/2005 | Bloechl et al. |
| 2005/0114124 A1 | 5/2005 | Liu et al. |
| 2005/0114140 A1 | 5/2005 | Brackett et al. |
| 2005/0119897 A1 | 6/2005 | Bennett et al. |
| 2005/0125235 A1 | 6/2005 | Lazay et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0061488 A1 * | 3/2006 | Dunton ........................ 340/988 |
| 2006/0077055 A1 | 4/2006 | Basir |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0117002 A1 | 6/2006 | Swen |
| 2006/0122834 A1 | 6/2006 | Bennett |
| 2006/0136280 A1 | 6/2006 | Cho et al. |
| 2006/0141990 A1 | 6/2006 | Zak et al. |
| 2006/0143007 A1 | 6/2006 | Koh et al. |
| 2006/0156252 A1 * | 7/2006 | Sheshagiri et al. ............ 715/825 |
| 2006/0156307 A1 | 7/2006 | Kunjithapatham et al. |

(56) References Cited

U.S. PATENT DOCUMENTS

| | | |
|---|---|---|
| 2007/0006098 A1 | 1/2007 | Krumm et al. |
| 2007/0014280 A1 | 1/2007 | Cormier et al. |
| 2007/0027732 A1 | 2/2007 | Hudgens |
| 2007/0036117 A1 | 2/2007 | Taube et al. |
| 2007/0036286 A1 | 2/2007 | Champlin et al. |
| 2007/0050191 A1 | 3/2007 | Weider et al. |
| 2007/0052586 A1 | 3/2007 | Horstemeyer |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0124149 A1 | 5/2007 | Shen et al. |
| 2007/0135949 A1 | 6/2007 | Snover et al. |
| 2007/0143163 A1 | 6/2007 | Weiss et al. |
| 2007/0174188 A1 | 7/2007 | Fish |
| 2007/0185754 A1* | 8/2007 | Schmidt ............................ 705/9 |
| 2007/0185917 A1 | 8/2007 | Prahlad et al. |
| 2007/0208726 A1 | 9/2007 | Krishnaprasad et al. |
| 2007/0276714 A1 | 11/2007 | Beringer |
| 2007/0276810 A1 | 11/2007 | Rosen |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0071544 A1 | 3/2008 | Beaufays et al. |
| 2008/0079566 A1 | 4/2008 | Singh et al. |
| 2008/0082390 A1* | 4/2008 | Hawkins et al. ................. 705/9 |
| 2008/0082651 A1 | 4/2008 | Singh et al. |
| 2008/0096531 A1 | 4/2008 | McQuaide et al. |
| 2008/0101584 A1 | 5/2008 | Gray et al. |
| 2008/0120112 A1 | 5/2008 | Jordan et al. |
| 2008/0129520 A1 | 6/2008 | Lee |
| 2008/0132221 A1 | 6/2008 | Willey |
| 2008/0140657 A1 | 6/2008 | Azvine et al. |
| 2008/0195312 A1 | 8/2008 | Aaron et al. |
| 2008/0221880 A1 | 9/2008 | Cerra et al. |
| 2008/0221903 A1 | 9/2008 | Kanevsky et al. |
| 2008/0228496 A1 | 9/2008 | Yu et al. |
| 2008/0242363 A1 | 10/2008 | Onda et al. |
| 2008/0247519 A1 | 10/2008 | Abella et al. |
| 2008/0249770 A1 | 10/2008 | Kim et al. |
| 2008/0281510 A1 | 11/2008 | Shahine et al. |
| 2008/0294418 A1* | 11/2008 | Cleary et al. .................... 703/21 |
| 2008/0300878 A1 | 12/2008 | Bennett |
| 2008/0313335 A1* | 12/2008 | Jung et al. ..................... 709/227 |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0094033 A1 | 4/2009 | Mozer et al. |
| 2009/0100049 A1 | 4/2009 | Cao |
| 2009/0112572 A1 | 4/2009 | Thorn |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0191895 A1 | 7/2009 | Singh et al. |
| 2009/0216704 A1 | 8/2009 | Zheng et al. |
| 2009/0219166 A1 | 9/2009 | MacFarlane et al. |
| 2009/0239552 A1 | 9/2009 | Churchill et al. |
| 2009/0253463 A1 | 10/2009 | Shin et al. |
| 2009/0271109 A1 | 10/2009 | Lee et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306980 A1 | 12/2009 | Shin |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0145700 A1 | 1/2010 | Kennewick et al. |
| 2010/0036660 A1 | 2/2010 | Bennett |
| 2010/0042400 A1 | 2/2010 | Block et al. |
| 2010/0081456 A1 | 4/2010 | Singh et al. |
| 2010/0088020 A1 | 4/2010 | Sano et al. |
| 2010/0138215 A1 | 6/2010 | Williams |
| 2010/0138416 A1 | 6/2010 | Bellotti |
| 2010/0146442 A1* | 6/2010 | Nagasaka et al. ............ 715/810 |
| 2010/0204986 A1 | 8/2010 | Kennewick et al. |
| 2010/0217604 A1 | 8/2010 | Baldwin et al. |
| 2010/0222033 A1 | 9/2010 | Scott et al. |
| 2010/0223131 A1 | 9/2010 | Scott et al. |
| 2010/0228540 A1 | 9/2010 | Bennett |
| 2010/0229082 A1 | 9/2010 | Karmarkar et al. |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332280 A1 | 12/2010 | Bradley et al. |
| 2010/0332348 A1 | 12/2010 | Cao |
| 2011/0016421 A1 | 1/2011 | Krupka et al. |
| 2011/0047072 A1 | 2/2011 | Ciurea |
| 2011/0060807 A1 | 3/2011 | Martin et al. |
| 2011/0076994 A1 | 3/2011 | Kim et al. |
| 2011/0082688 A1 | 4/2011 | Kim et al. |
| 2011/0090078 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0195758 A1 | 8/2011 | Damale et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0260861 A1 | 10/2011 | Singh et al. |
| 2011/0264643 A1 | 10/2011 | Cao |
| 2011/0279368 A1 | 11/2011 | Klein et al. |
| 2011/0306426 A1 | 12/2011 | Novak et al. |
| 2011/0307810 A1 | 12/2011 | Hilerio et al. |
| 2011/0314404 A1* | 12/2011 | Kotler et al. .................. 715/772 |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035925 A1 | 2/2012 | Friend et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0124126 A1 | 5/2012 | Alcazar et al. |

(56) References Cited

U.S. PATENT DOCUMENTS

| | | |
|---|---|---|
| 2012/0136572 A1 | 5/2012 | Norton |
| 2012/0137367 A1 | 5/2012 | Dupont et al. |
| 2012/0149394 A1 | 6/2012 | Singh et al. |
| 2012/0150580 A1 | 6/2012 | Norton |
| 2012/0158293 A1 | 6/2012 | Burnham |
| 2012/0158422 A1 | 6/2012 | Burnham et al. |
| 2012/0173464 A1 | 7/2012 | Tur et al. |
| 2012/0214517 A1 | 8/2012 | Singh et al. |
| 2012/0242482 A1 | 9/2012 | Elumalai et al. |
| 2012/0265528 A1 | 10/2012 | Gruber et al. |
| 2012/0271676 A1 | 10/2012 | Aravamudan et al. |
| 2012/0309363 A1 | 12/2012 | Gruber et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0317498 A1 | 12/2012 | Logan et al. |
| 2013/0005405 A1 | 1/2013 | Prociw |
| 2013/0115927 A1 | 5/2013 | Gruber et al. |
| 2014/0033071 A1 | 1/2014 | Gruber et al. |
| 2014/0052680 A1 | 2/2014 | Nitz et al. |
| 2014/0122136 A1 | 5/2014 | Jayanthi |
| 2017/0083179 A1 | 3/2017 | Gruber et al. |

FOREIGN PATENT DOCUMENTS

| | | |
|---|---|---|
| CN | 101277501 A | 10/2008 |
| CN | 101453498 A | 6/2009 |
| CN | 101939740 A | 1/2011 |
| DE | 3837590 A1 | 5/1990 |
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2096840 A1 | 9/2009 |
| EP | 2 109 295 A1 | 10/2009 |
| GB | 2293667 A | 4/1996 |
| JP | 06 019965 | 1/1994 |
| JP | 10-69578 A | 3/1998 |
| JP | 2001 125896 | 5/2001 |
| JP | 2002 024212 | 1/2002 |
| JP | 2002-41624 A | 2/2002 |
| JP | 2002-281562 A | 9/2002 |
| JP | 2003517158 A | 5/2003 |
| JP | 2004-171216 A | 6/2004 |
| JP | 2005-080094 A | 3/2005 |
| JP | 2005-223782 A | 8/2005 |
| JP | 2006-107438 A | 4/2006 |
| JP | 2006-155368 A | 6/2006 |
| JP | 2006-166118 A | 6/2006 |
| JP | 2006-309457 A | 11/2006 |
| JP | 2007-193794 A | 8/2007 |
| JP | 2008-134949 A | 6/2008 |
| JP | 2008-526101 A | 7/2008 |
| JP | 2008-217468 A | 9/2008 |
| JP | 2008-252161 A | 10/2008 |
| JP | 2009 036999 | 2/2009 |
| JP | 2009-134409 A | 6/2009 |
| JP | 2009-294946 A | 12/2009 |
| JP | 2010-518475 A | 5/2010 |
| JP | 2010-157207 A | 7/2010 |
| JP | 2010-287063 A | 12/2010 |
| KR | 10-2006-0127647 A | 12/2006 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 1020100053149 A | 5/2010 |
| KR | 10 2011 0113414 A | 10/2011 |
| KR | 10-2011-0115134 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 2000/60435 | 10/2000 |
| WO | WO 2000/60435 A3 | 10/2000 |
| WO | WO 02/073603 A1 | 9/2002 |
| WO | WO 2006/129967 A1 | 12/2006 |
| WO | 2007/036762 A1 | 4/2007 |
| WO | WO 2007/080559 A2 | 7/2007 |
| WO | WO 2008/085742 A2 | 7/2008 |
| WO | WO 2008/109835 A2 | 9/2008 |
| WO | 2009/075912 A1 | 6/2009 |
| WO | WO 2011/088053 A2 | 7/2011 |
| WO | WO 2012/167168 A2 | 12/2012 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

(56) References Cited

OTHER PUBLICATIONS

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al., "NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Sid for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

(56) References Cited

OTHER PUBLICATIONS

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice On The Go (BlackBerry)," 2:51 minute video uploaded to YouTube by VoiceOnTheGo on Jul. 27, 2009, http://www.youtube.com/watch?v=pJqpWgQS98w, 1 page.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc.* v. *West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Roddy, D., et al., "Communication and Collaboration in a Landscape of B2B eMarketplaces," VerticalNet Solutions, white paper, Jun. 15, 2000, 23 pages.
Office Action received in PCT Application No. PCT/US/11/20861 dated Nov. 29, 2011 (15 pages).
Current Claims of PCT Application No. PCT/US11/20861 dated Nov. 2011 (17 pages).
International Search Report and Written Opinion dated Nov. 16, 2012, received in International Application No. PCT/US2012/040571, 14 pages (Apple Inc.).
Car Working Group, "Bluetooth Doc Hands-Free Profile 1.5 HFP1.5_SPEC," Nov. 25, 2005, www.bluetooth.org, 84 pages.
Cohen, Michael H., et al., "Voice User Interface Design," excerpts from Chapter 1 and Chapter 10, Addison-Wesley ISBN:0-321-18576-5, 2004, 36 pages.
Gong, J., et al., "Guidelines for Handheld Mobile Device Interface Design," Proceedings of DSI 2004 Annual Meeting, pp. 3751-3756.

(56) References Cited

OTHER PUBLICATIONS

Horvitz, E., "Handsfree Decision Support: Toward a Non-invasive Human-Computer Interface," Proceedings of the Symposium on Computer Applications in Medical Care, IEEE Computer Society Press, Nov. 1995, 1 page.
Horvitz, E., "In Pursuit of Effective Handsfree Decision Support: Coupling Bayesian Inference, Speech Understanding, and User Models," 1995, 8 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
"Top 10 Best Practices for Voice User Interface Design," Nov. 1, 2002, http://www.developer.com/voice/article.php/1567051/Top-10-Best-Practices-for-Voice-User-Interface-Design.htm, 4 pages.
GB Patent Act 1977: Combined Search Report and Examination Report under Sections 17 and 18(3) for Application No. GB1217449. 6, report dated Jan. 17, 2013, 6 pages.
GB Patent Act 1977: Combined Search Report and Examination Report under Sections 17 and 18(3) for Application No. GB1009318. 5, report dated Oct. 8, 2010, 5 pages.
Australian Office Action dated Dec. 7, 2012 for Application No. 2010254812, 8 pages.
Australian Office Action dated Nov. 13, 2012 for Application No. 2011205426, 7 pages.
Australian Office Action dated Oct. 31, 2012 for Application No. 2012101191, 6 pages.
EP Communication under Rule-161(2) and 162 EPC for Application No. 117079392.2-2201, 4 pages.
Notice of Allowance dated Feb. 29, 2012, received in U.S. Appl. No. 11/518,292, 29 pages (Cheyer).
Final Office Action dated May 10, 2011, received in U.S. Appl. No. 11/518,292, 14 pages (Cheyer).
Office Action dated Nov. 24, 2010, received in U.S. Appl. No. 11/518,292, 12 pages (Cheyer).
Office Action dated Nov. 9, 2009, received in U.S. Appl. No. 11/518,292, 10 pages (Cheyer).
Office Action dated Mar. 14, 2013, received in U.S. Appl. No. 12/987,982, 59 pages (Gruber).
Final Office Action dated Jun. 19, 2012, received in U.S. Appl. No. 12/479,477, 46 pages (van Os).
Office Action dated Sep. 29, 2011, received in U.S. Appl. No. 12/479,477, 32 pages (van Os).
Office Action dated Nov. 28, 2012, received in U.S. Appl. No. 13/251,104, 49 pages (Gruber).
Office Action dated Dec. 7, 2012, received in U.S. Appl. No. 13/251,118, 52 pages (Gruber).
Current claims of PCT Application No. PCT/US11/20861 dated Jan. 11, 2011, 17 pages.
International Search Report and Written Opinion dated Aug. 25, 2010, received in International Application No. PCT/US2010/037378, which corresponds to U.S. Appl. No. 12/479,477, 16 pages (Apple Inc.).
International Search Report and Written Opinion dated Dec. 20, 2012, received in International Application No. PCT/US2012/056382, which corresponds to U.S. Appl. No. 13/250,947, 11 pages (Gruber).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI Research International, Cambridge Computer Science Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright @ 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom.2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial

(56) References Cited

OTHER PUBLICATIONS

Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.

(56) References Cited

OTHER PUBLICATIONS

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," Jan. 1991, SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages. Best Copy Available.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

Oaa, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., "Abductive Equivalential Translation and its application to Natural Language Database Interfacing," Sep. 1993 Dissertation paper, SRI International, 163 pages.

Rayner, M., et al., "Adapting the Core Language Engine to French and Spanish," May 10, 1996, Cornell University Library, 9 pages. http://arxiv.org/abs/cmp-lg/9605015.

(56) References Cited

OTHER PUBLICATIONS

Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System," Jan. 1999, 5 pages.
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH-Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," Carnegie Mellon University, Jun. 1990, 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Australian Office Action dated Jul. 2, 2013 for Application No. 2011205426, 9 pages.
Certificate of Examination dated Apr. 29, 2013 for Australian Patent No. 2012101191, 4 pages.
Certificate of Examination dated May 21, 2013 for Australian Patent No. 2012101471, 5 pages.
Certificate of Examination dated May 10, 2013 for Australian Patent No. 2012101466, 4 pages.
Certificate of Examination dated May 9, 2013 for Australian Patent No. 2012101473, 4 pages.
Certificate of Examination dated May 6, 2013 for Australian Patent No. 2012101470, 5 pages.

(56) References Cited

OTHER PUBLICATIONS

Certificate of Examination dated May 2, 2013 for Australian Patent No. 2012101468, 5 pages.
Certificate of Examination dated May 6, 2013 for Australian Patent No. 2012101472, 5 pages.
Certificate of Examination dated May 6, 2013 for Australian Patent No. 2012101469, 4 pages.
Certificate of Examination dated May 13, 2013 for Australian Patent No. 2012101465, 5 pages.
Certificate of Examination dated May 13, 2013 for Australian Patent No. 2012101467, 5 pages.
Extended European Search Report dated Jul. 16, 2013, received in Application No. 12186663.6-1910, which corresponds to U.S. Appl. No. 13/250,854, 8 pages (Gruber).
Notice of Allowance dated Jul. 10, 2013, received in U.S. Appl. No. 13/725,656, 14 pages (Gruber).
Notice of Allowance dated Jun. 12, 2013, received in U.S. Appl. No. 11/518,292, 16 pages (Cheyer).
Final Office Action dated Jun. 13, 2013, received in U.S. Appl. No. 13/251,118, 42 pages (Gruber).
Office Action dated Jul. 26, 2013, received in U.S. Appl. No. 13/725,512, 36 pages (Gruber).
Office Action dated Jul. 11, 2013, received in U.S. Appl. No. 13/784,707, 29 pages (Cheyer).
Office Action dated Jul. 5, 2013, received in U.S. Appl. No. 13/725,713, 34 pages (Guzzoni).
Office Action dated Jul. 2, 2013, received in U.S. Appl. No. 13/725,761, 14 pages (Gruber).
Office Action dated Jun. 28, 2013, received in U.S. Appl. No. 13/725,616, 29 pages (Cheyer).
Office Action dated Jun. 27, 2013, received in U.S. Appl. No. 13/725,742, 29 pages (Cheyer).
Office Action dated May 23, 2013, received in U.S. Appl. No. 13/784,694, 27 pages (Gruber).
Office Action dated Jul. 5, 2013, received in U.S. Appl. No. 13/725,481, 26 pages (Gruber).
Extended European Search Report (includes Supplementary European Search Report and Search Opinion) received for European Patent Application No. 12727027.0, dated Sep. 26, 2014, 7 pages.
International Search Report received for PCT Patent Application No. PCT/US2013/041233, dated Nov. 22, 2013, 3 pages.
International Preliminary Report on Patentability received for PCT Patent Application No. PCT/US2012/040571, dated Dec. 19, 2013, 10 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Lewis, Cameron, "Task Ave for iPhone Review, Mac Life", available online at <http://www.maclife.com/article/reviews/task_ave_iphone_review>, Mar. 3, 2011, 5 pages.
Ng, Simon, "Google's Task List Now Comes to Iphone", SimonBlog, available online at <http://www.simonblog.com/2009/02/04/googles-task-list-now-comes-to-iphone/>, Feb. 4, 2009, 3 pages.
Extended European Search Report received for European Patent Application No. 13726938.7, dated Dec. 14, 2015, 8 pages.
International Preliminary Report on Patentability received for PCT Patent Application No. PCT/US2013/041233, dated Nov. 18, 2014, 8 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

(56) References Cited

OTHER PUBLICATIONS

Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.orc/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," COMPUTER Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.

(56) References Cited

OTHER PUBLICATIONS

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and.Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright @ 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

(56) References Cited

OTHER PUBLICATIONS

Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
Van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture—2 course presentation, University of Maryland, College Park, 8 pages.
Wu, M., "Speech Recognition, Synthesis, and H.C.I.," ENEE408G Capstone-Multimedia Signal Processing, Spring 2003, Lecture—3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
International Search Report and Written Opinion dated Nov. 29, 2011, received in International Application No. PCT/US2011/20861, which corresponds to U.S. Appl. No. 12/987,982, 15 pages (Thomas Robert Gruber).
Australian Office Action dated Nov. 27, 2012 for Application No. 2012101471, 6 pages.
Australian Office Action dated Nov. 22, 2012 for Application No. 2012101466, 6 pages.
Australian Office Action dated Nov. 14, 2012 for Application No. 2012101473, 6 pages.
Australian Office Action dated Nov. 19, 2012 for Application No. 2012101470, 5 pages.
Australian Office Action dated Nov. 28, 2012 for Application No. 2012101468, 5 pages.
Australian Office Action dated Nov. 19, 2012 for Application No. 2012101472, 5 pages.
Australian Office Action dated Nov. 19, 2012 for Application No. 2012101469, 6 pages.
Australian Office Action dated Nov. 15, 2012 for Application No. 2012101465, 6 pages.
Australian Office Action dated Nov. 30, 2012 for Application No. 2012101467, 6 pages.
Canadian Office Action dated Mar. 27, 2013 for Application No. 2,793,118, 3 pages.
Final Office Action dated Mar. 25, 2013, received in U.S. Appl. No. 13/251,127, 53 pages (Gruber).
Office Action dated Apr. 16, 2013, received in U.S. Appl. No. 13/725,550, 8 pages (Cheyer).
Office Action dated Mar. 27, 2013, received in U.S. Appl. No. 13/725,656, 22 pages (Gruber).
Office Action dated Mar. 7, 2013, received in U.S. Appl. No. 13/492,809, 26 pages (Gruber).
Office Action dated Jan. 31, 2013, received in U.S. Appl. No. 13/251,088, 38 pages (Gruber).
Office Action dated Nov. 8, 2012, received in U.S. Appl. No. 13/251,127, 35 pages (Gruber).
Russian Office Action dated Nov. 8, 2012 for Application No. 2012144647, 7 pages.
Russian Office Action dated Dec. 6, 2012 for Application No. 2012144605, 6 pages.
Advisory Action received for U.S. Appl. No. 13/251,104, dated Nov. 2, 2015, 3 pages.
Advisory Action received for U.S. Appl. No. 13/729,597, dated Oct. 16, 2015, 5 pages.

(56) References Cited

OTHER PUBLICATIONS

Advisory Action received for U.S. Appl. No. 13/894,354, dated Mar. 24, 2016, 4 pages.
Board Opinion received for Chinese Patent Application No. 201280027176.5, dated Feb. 12, 2018, 10 pages (1 page of English Summary and 9 pages of Official Copy).
Final Office Action received for U.S. Appl. No. 13/251,104, dated Aug. 14, 2013, 39 pages.
Final Office Action received for U.S. Appl. No. 13/251,104, dated Jul. 10, 2015, 36 pages.
Final Office Action received for U.S. Appl. No. 13/251,118, dated Jun. 13, 2013, 35 pages.
Final Office Action received for U.S. Appl. No. 13/251,118, dated Oct. 2, 2015, 27 pages.
Final Office Action received for U.S. Appl. No. 13/251,127, dated May 5, 2016, 60 pages.
Final Office Action received for U.S. Appl. No. 13/729,597, dated Jun. 26, 2015, 27 pages.
Final Office Action received for U.S. Appl. No. 13/729,597, dated Jun. 29, 2017, 49 pages.
Final Office Action received for U.S. Appl. No. 13/894,354, dated Oct. 7, 2015, 25 pages.
Non-Final Office Action received for U.S. Appl. No. 13/251,104, dated Jan. 28, 2014, 48 pages.
Non-Final Office Action received for U.S. Appl. No. 13/251,104, dated Nov. 28, 2012, 32 pages.
Non-Final Office Action received for U.S. Appl. No. 13/251,104, dated Oct. 9, 2014, 52 pages.
Non-Final Office Action received for U.S. Appl. No. 13/251,118, dated Jan. 30, 2015, 20 pages.
Non-Final Office Action received for U.S. Appl. No. 13/251,118, dated Jun. 6, 2014, 33 pages.
Non-Final Office Action received for U.S. Appl. No. 13/251,127, dated Jan. 16, 2014, 46 pages.
Non-Final Office Action received for U.S. Appl. No. 13/251,127, dated Jul. 17, 2015, 53 pages.
Non-Final Office Action received for U.S. Appl. No. 13/251,127, dated Nov. 5, 2014, 42 pages.
Non-Final Office Action received for U.S. Appl. No. 13/729,597, dated Dec. 18, 2014, 19 pages.
Non-Final Office Action received for U.S. Appl. No. 13/729,597, dated Dec. 21, 2016, 30 pages.
Non-Final Office Action received for U.S. Appl. No. 13/894,354, dated Apr. 9, 2015, 20 pages.
Non-Final Office Action received for U.S. Appl. No. 13/894,354, dated Jan. 13, 2017, 28 pages.
Non-Final Office Action received for U.S. Appl. No. 13/894,354, dated Jul. 3, 2017, 32 pages.
Notice of Acceptance received for Australian Patent application No. 2012261958, dated Apr. 6, 2016, 3 pages.
Notice of Acceptance received for Australian Patent application No. 2013262803, dated Jul. 8, 2016, 3 pages.
Notice of Acceptance received for Australian Patent application No. 2016204091, dated Feb. 28, 2018, 3 pages.
Notice of Allowance received for Japanese Patent Application No. 2014-513765, dated May 8, 2017, 3 pages (Official Copy only) (See Communication under 37 CFR § 1.98(a) (3)).
Notice of Allowance received for Japanese Patent application No. 2015-512807, dated Jul. 28, 2017, 3 pages (Official Copy only) (See Communication under 37 CFR § 1.98(a) (3)).
Notice of Allowance received for Korean Patent Application No. 10-2013-7034856, dated Mar. 22, 2017, 4 pages (1 page of English Translation and 3 pages of Official Copy).
Notice of Allowance received for Korean Patent Application No. 10-2014-7033076, dated Oct. 31, 2016, 4 pages (1 page of English Translation and 3 pages of Official copy).
Notice of Allowance received for U.S. Appl. No. 13/729,597, dated Nov. 30, 2017, 10 pages.
Office Action received for Australian Patent Application No. 2012261958, dated Mar. 10, 2016, 3 pages.
Office Action received for Australian Patent Application No. 2012261958, dated Mar. 27, 2015, 3 pages.
Office Action received for Australian Patent Application No. 2013262803, dated Aug. 6, 2015, 3 pages.
Office Action received for Australian Patent Application No. 2016204091, dated Mar. 3, 2017, 3 pages.
Office Action received for Chinese Patent Application No. 201280027176.5, dated Aug. 26, 2016, 12 pages (3 pages of English Translation and 9 pages of Official Copy).
Office Action received for Chinese Patent Application No. 201280027176.5, dated Dec. 29, 2015, 22 pages (12 pages of English Translation and 10 pages of Official copy).
Office Action received for Chinese Patent Application No. 201280027176.5, dated Feb. 15, 2017, 9 pages (1 pages of English Translation and 8 pages of Official copy).
Office Action received for Chinese Patent Application No. 201380028060.8, dated Dec. 14, 2017, 6 pages (3 pages of English Translation and 3 pages of Official copy).
Office Action received for Chinese Patent Application No. 201380028060.8, dated Feb. 8, 2017, 14 pages (3 pages of English Translation and 11 pages of Official Copy).
Office Action received for European Patent Application No. 12727027.0, dated Mar. 8, 2017, 6 pages.
Office Action received for European Patent Application No. 13726938.7, dated Jan. 11, 2018, 7 pages.
Office Action received for Japanese Patent Application No. 2014-513765, dated Dec. 2, 2016, 7 pages (3 pages of English Translation and 4 pages of Official Copy).
Office Action received for Japanese Patent Application No. 2014-513765, dated Jan. 5, 2016, 8 pages (4 pages of English Translation and 4 pages of Official copy).
Office Action received for Japanese Patent Application No. 2014-513765, dated Jan. 19, 2015, 8 pages (5 pages of English Translation and 3 pages of Official copy).
Office Action received for Japanese Patent Application No. 2015-512807, dated Nov. 2, 2015, 5 pages (Official Copy Only) (See Communication under 37 CFR § 1.98(a) (3)).
Office Action received for Japanese Patent Application No. 2015-512807, dated Oct. 3. 2016, 9 pages (4 pages of English Translation and 5 pages of Official copy).
Office Action received for Korean Patent Application No. 10-2013-7034856, dated Apr. 29, 2016, 7 pages (3 pages of English Translation and 4 pages of Official Copy).
Office Action received for Korean Patent Application No. 10-2013-7034856, dated Jun. 13, 2015, 13 pages (8 pages of English Translation and 5 pages of Official Copy).
Office Action received for Korean Patent Application No. 10-2014-7033076, dated Dec. 23, 2015, 9 pages (4 pages of English Translation and 5 pages of Official copy).
Office Action received for Korean Patent Application No. 10-2017-7017149, dated Sep. 21, 2017, 10 pages (4 pages of English Translation and 6 pages of Official Copy).
Summons to Attend Oral Proceeding received for European Patent Application No. 12727027.0, dated Apr. 3, 2018, 15 pages.
Supplementary European Search Report received for European Patent Application No. 12727027.0, dated Oct. 14, 2014, 1 page.
Notice of Allowance received for U.S. Appl. No. 13/729,597, dated Apr. 18, 2018, 12 pages.
Office Action received for Japanese Patent Application No. 2017-068594, dated May 7, 2018, 10 pages (5 pages of English Translation and 5 pages of Official Copy).
Board Opinion received for Chinese Patent Application No. 201280027176.5, dated Jun. 14, 2018, 12 pages (2 pages of English Translation and 10 pages of Official Copy).
Notice of Allowance received for Chinese Patent Application No. 201380028060.8, dated Jul. 10, 2018, 2 pages (1 page of English Translation and 1 page of Official Copy only).
Notice of Allowance received for Korean Patent Application No. 10-2017-7017149, dated Jul. 30, 2018, 4 pages (1 page of English Translation and 3 pages of Official Copy).
Preliminary Opinion received for European Patent Application No. 12727027.0, dated Aug. 8, 2018, 20 pages.

(56) References Cited

OTHER PUBLICATIONS

Final Office Action received for U.S. Appl. No. 13/251,127, dated Mar. 25, 2013, 46 pages.
Non-Final Office Action received for U.S. Appl. No. 13/251,118, dated Dec. 7, 2012, 34 pages.
Non-Final Office Action received for U.S. Appl. No. 13/251,127, dated Nov. 8, 2012, 18 pages.
Notice of Allowance received for U.S. Appl. No. 13/894,354, dated Aug. 30, 2018, 13 pages.
Decision to Refuse received for European Patent Application No. 12727027.0, dated Oct. 18, 2018, 29 pages.
Minutes of Meeting received for European Patent Application No. 12727027.0, dated Oct. 18, 2018, 3 pages.

\* cited by examiner

GENERATING AND PROCESSING TASK ITEMS THAT REPRESENT TASKS TO PERFORM

CROSS-REFERENCE TO RELATED APPLICATIONS

The present application claims priority to U.S. Provisional Patent Application No. 61/493,201, entitled "Generating And Processing Data Items That Represent Tasks To Perform," filed on Jun. 3, 2011, invented by Thomas R. Gruber, et al., the entire disclosure of which is incorporated by reference for all purposes as if fully set forth herein.

This application is related to U.S. patent application Ser. No. 12/479,477, filed Jun. 5, 2009, the entire contents of which are hereby incorporated by reference as if fully set forth herein.

This application is related to U.S. patent application Ser. No. 12/987,982, filed Jan. 10, 2011, the entire contents of which are hereby incorporated by reference as if fully set forth herein.

This application is related to U.S. patent application Ser. No. 13/250,854, filed Sep. 30, 2011, the entire content of which are hereby incorporated by reference as if fully set forth herein.

FIELD OF THE INVENTION

The present invention relates to electronic reminders and, more particularly to, the intelligent generation, organization, triggering, and delivery of reminders and tasks in electronic to-do lists.

BACKGROUND

People have devised numerous ways to remind themselves of certain tasks or events. Many people have and still do write on physical media, such as sticky notes and calendars. With the ubiquity of electronic devices, many people have turned to computers to help manage their to-do lists and keep of record of upcoming events. Numerous reminder and to-do applications are available, both for desktop computers as well as handheld devices, such as laptop computers, tablet computers, and "smart" phones.

However, the timeliness and accuracy of a notification provided to a user of a reminder application depends almost entirely on input received from the user. For example, if a user enters, in a reminder application, a wrong date for an important event, then the user might not receive a notification of the event until after the event occurs. As another example, if a user provides a generic description of a task (e.g., "send him an email") in a to-do application, then, when the user later reads the description, the user might not remember who "him" is and/or what the content of the email should be. In other words, when it comes to reminder and to-do applications, the old adage of "garbage in garbage out" is applicable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
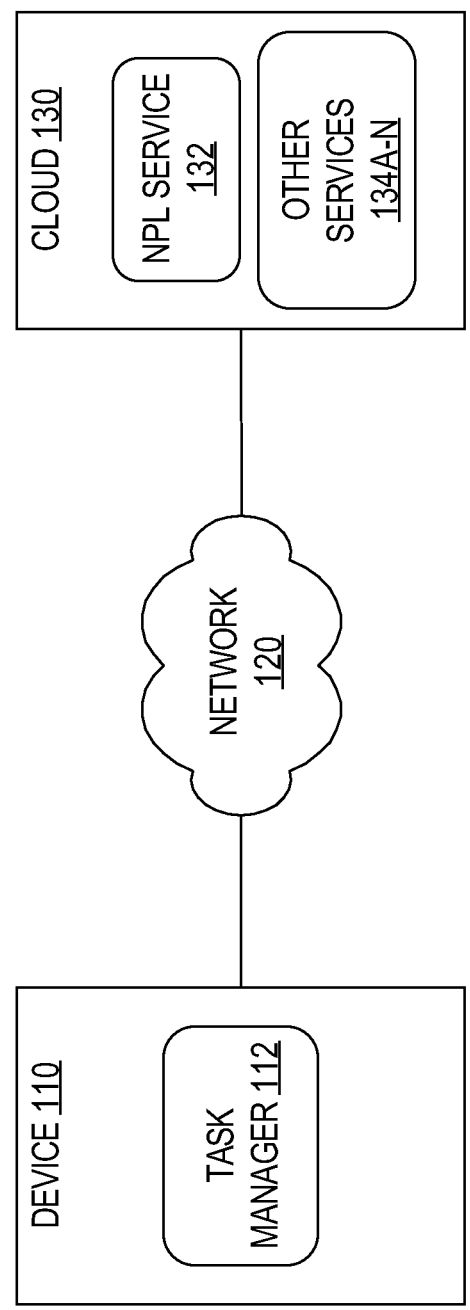
FIG. 1 is a block diagram that depicts a system that is used for creating and processing task items, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple techniques are provided below for assisting a user in managing his/her tasks. Tasks are represented as task items in a computing system. Specifically, approaches for generating task items, organizing task items, triggering the notification of tasks based on corresponding task items, and consuming task items are described in detail below.

With respect to generating a task item, a task item is generated based on input from a user. The input (whether voice or text) includes one or more details about a task while context of the input is used to determine one or more other details about the task. The one or more other details are not reflected in the input. Context may include data that is stored on a device of the user. For example, a user provides the following voice input: "Call George at 5 PM today." The user may have a contact list that includes information about multiple people with the first name of George. However, based on the context of the input, such as a recent voice message from a phone number associated with a particular George, it can be determined which George the user intends to call. In this way, a user is not required to be specific about each detail of a task when providing input about the task.

With respect to triggering a notification of a task item, one or more characteristics of a device may be used to determine whether to trigger the notification. Thus, time is not the sole factor (if at all) of whether a notification should be provided to a user. Examples of such characteristics may include where the device is located, what the device is displaying or processing, and specific movements of the device. For example, the fact that the device is in a car or at work may trigger the generation of a reminder of a task. As another example, if the device is currently displaying web content, then a user of the device may be considered to be "online," which status might trigger a notification of a task to be provided to the user.

With respect to "consuming" task items, instead of simply providing a reminder of a task, the task is automated so that a user is not required to perform the steps typically required to perform the task. For example, a user may want to call a particular person at a particular time. When the particular time equals the current time, instead of simply reminding the user about the call, the call can be set up, ready to make without the user having to specify the person's phone number.

With respect to organizing task items, task items may be organized automatically or manually into multiple lists. Each list corresponds to a different attribute of a task item, such as the type of task, the type of criteria that is used to trigger a notification of a task, and the location of where the task is to be performed.

Task Items

Again, a "task item" is an electronic data item that contains one or more details about a task to perform, whether by a user or automatically by a process. A task item is generated based on input from a user. A task item may be one of two types: tasks associated with reminders ("reminder task") and tasks not associated with reminders ("non-reminder task"). A reminder task is associated with an action, such as a notification being generated and provided to a user, while a non-reminder task is not associated with any action. A non-reminder task may be associated with a "complete-by" date or time. However, the complete-by date or time does not trigger the creation of a notification or other action. In other words, while a reminder task is associated with one or more triggering criteria that, when satisfied, trigger an action, a non-reminder task is not. Thus, a "task item" may or may not be associated with one or more triggering criteria that, when satisfied, triggers an action.

System Overview

FIG. 1 is a block diagram that depicts a system 100 that is used for creating task items and processing task items, according to an embodiment of the invention. System 100 includes a device 110, a network 120, and a cloud 130.

Device 110 is any computing device that is capable of receiving input from a user and displaying information about tasks. Non-limiting examples of device 110 include a desktop computer and a handheld device, such as a laptop computer, a tablet computer, and a "smart" phone. In the illustrated embodiment, device 110 includes a task manager 112. Task manager 112 processes task items, both of the reminder type or of the non-reminder type. Task manager 112 may be implemented in software, hardware, or any combination of software and hardware.

Device 110 includes communication technology (e.g., wireless technology) for sharing information with other devices. Device 110 can include a variety of integrated user interface units or can be coupled to user interface units through one or more communication ports or data links of the device. Non-limiting examples of user interface units include a voice input unit (e.g., a microphone), physical input units (e.g., a keyboard, a mouse, a track ball, a rotary dial or wheel, a touchpad, or a touch-screen), and motion sensors (e.g., an accelerometer, magnetometer, or a gyroscope). Any of these user interface units can be implemented as an external unit that communicates with device 110 to provide user input using a wired or wireless communication technology. Examples of wired communication technology include Universal Serial Bus (USB) interface, FireWire interface, etc. Examples of wireless communication technology include Bluetooth, Wi-Fi, and WiMax, infrared. Through these user interface units, device 110 can receive physical or voice inputs from the user.

Device 110 includes one or more output units to present visual and audio information to a user. Non-limiting examples of output units include a display unit for displaying visual data and a speaker for playing audio.

Cloud 130 is implemented by one or more computing devices. Cloud 130 hosts multiple services, such as a NLP (natural language processing) service 132 and one or more other services 134A-N. NLP service 132 uses one or more models of real-world things that a user can talk about in order to make sense of what the user is trying to say. For example, NLP service 132 can determine, based on models and context, what a user may be referring to when the user uses terms like, "him," "there," or "that." An example of how NLP service 132 might operate is described in U.S. patent application Ser. No. 12/987,982, referenced above.

NLP service 132 may employ numerous APIs to communicate with and initiate actions performed by the one or more other services 134A-N and, optionally, other services not hosted in cloud 130. For example, in response to voice data sent from device 110, where the voice data reflects the user command "Reserve two seats at Maribella's in San Jose at 7 PM tonight," NLP service 132 makes an API call to an online reservation service provided by Maribella's restaurant to initiate the creation of two reservations at that restaurant for 7 PM. Thus, NLP service 132 allows many operations to be performed automatically without requiring a user of device 110 to manually input text data and interact with numerous applications.

Communication between device 110 and services hosted in cloud 130 is made possible via network 120. Network 120 may be implemented by any medium or mechanism that provides for the exchange of data between various computing devices. Examples of such a network include, without limitation, a network such as a Local Area Network (LAN), Wide Area Network (WAN), Ethernet or the Internet, or one or more terrestrial, satellite, or wireless links. The network may include a combination of networks such as those described. Without limitation, the network may transmit data according to Transmission Control Protocol (TCP), User Datagram Protocol (UDP), and/or Internet Protocol (IP).

The following description includes numerous examples where both device 110 and cloud 130 take part in generating task items, organizing task items, triggering notifications of task items, and consuming task items. Instead, one or more of the techniques described herein may be implemented wholly on device 110 (making network 120 and cloud 130 unnecessary, wholly in cloud 130, or using some combination of device 110 and cloud 130.

Processing of Task Items

Task items may be created on device 110 or in cloud 130 based on input received at device 110. Although not depicted, task items may be stored on device 110 or in cloud 130, or synchronized to both. If task items are stored in cloud 130, then task manager 112 may retrieve the task items in response to, for example, input from a user or the one or more triggering criteria associated with one or more task items being satisfied.

In the scenario where task items are created and stored in cloud 130, task manager 112 may be, primarily, a set of one or more user interfaces that display information about tasks. Thus, a task service (not shown) in cloud 130 would be responsible for maintaining task items and triggering any notifications when triggering events occur.

Alternatively, task manager 112 creates and stores task items on device 110. In this scenario, task manager 112 may be entirely responsible for maintaining task items and generating any notifications when triggering events occur. One advantage of this scenario is that device 110 may be operating in an "offline" mode where device 110 is not capable of communicating with any service hosted in cloud 130.

Further, in this scenario, device 110 may include a service like NLP service 132, which may be part of task manager 112 or may execute separately from task manager 112. Such a service acts as a conversational interface to allow a user to quickly and easily create tasks. Such a service may be implemented by a process that is continually executing in the background without requiring a user of device 110 to provide input to cause the service to execute. Thus, whenever device 110 starts up (or restarts), the service is automatically started.

Alternatively, information needed to create task items may be identified by NLP service 132 (i.e., hosted in cloud 130). Device 110 may include a user input interface that continuously executes in the background, identifies input (e.g., voice or text) from a user, and sends the input over network 120 to NLP service 132. Once NLP service 132 identifies task details in the input, NLP service 132 may send task information (e.g., a description of a task and a time to complete the task) (a) over network 120 to task manager 112, which creates and stores a task item based on the information or (b) to a task service in cloud 130 to create a task item based on the information.

Most of the examples provided herein involve NLP service 132 receiving input data from device 110, identifying details (about a task) reflected in the input data, and providing those details to task manager 112. However, embodiments of the invention are not limited to this scenario. Such examples may alternatively involve only device 110 or may involve device 110 as merely an input and display device where NLP service 132 and a task service in cloud 130 provide the primary functionality.

I. Generating Task Items Based on Context

According to an embodiment of the invention, a task item is generated based on input and context of the input. "Context" of input refers to data that is currently or recently (relative to input, from a user, that initiated the generation of a task item) displayed or processed at device 110. Thus, context data is not reflected in the input from the user. For example, a user of device 110 may provide the following voice input: "Send him an email about the project when I get home." The pronoun "him" is ambiguous because it is not clear, from the input alone, to whom "him" refers. However, the context of the voice input may be that device 110 currently displays (or just recently displayed) an email from an individual named Jack Bauer where the email includes a request for a status update about a project named "Bunny." Based on the voice input and the context, task manager 112 (or a task service in cloud 130) creates a task item that includes the description "Send Jack Bauer an email about Project Bunny" and that includes the triggering criterion of device 110 being at a geographical location that is at or near the user's home. When device 110 is at or near the user's home, task manager 112 causes a notification to be displayed on device 110 where the notification includes the description from the task item.

Figure 2:
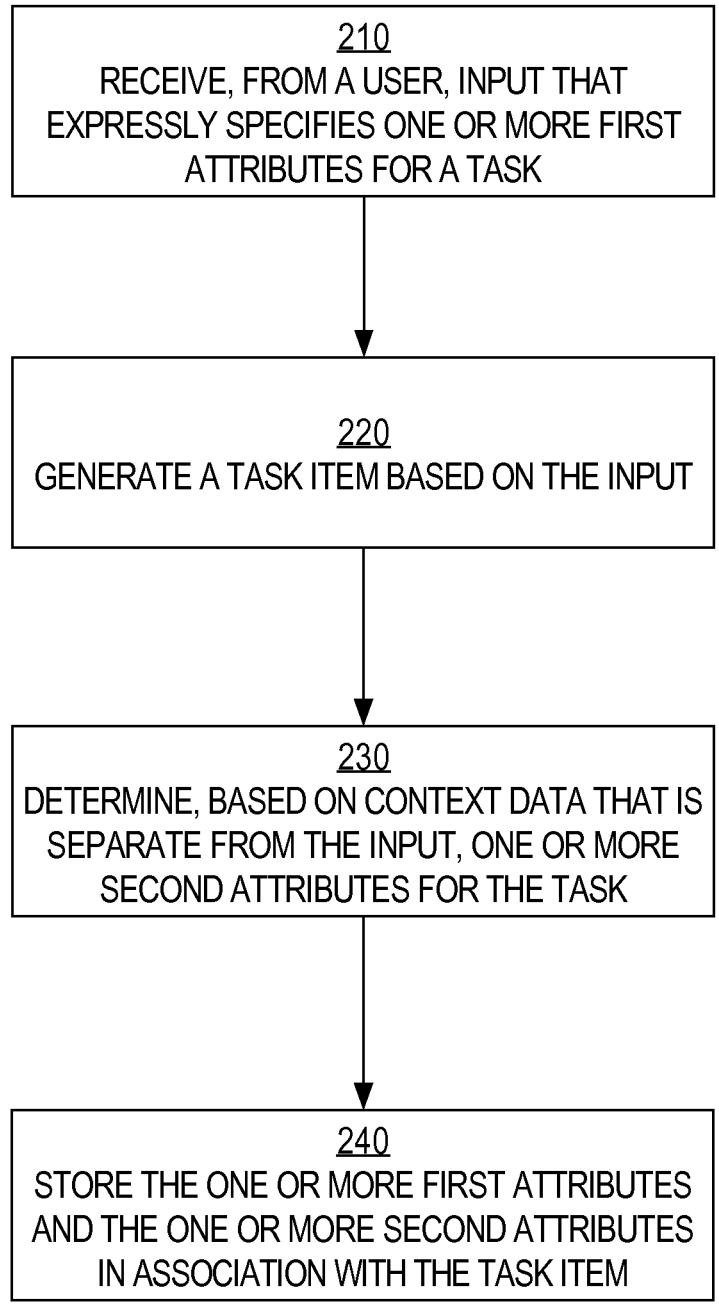
FIG. 2 is a flow diagram that depicts a process for generating a task item based on context of user input, according to an embodiment of the invention.

FIG. 2 is a flow diagram that depicts a process 200 for generating a task item based on context of user input, according to an embodiment of the invention. At step 210, input that expressly specifies one or more first attributes for a task is received from a user. The input may be text input or voice input. The text input may be from a user of device 110 pressing physical keys on device 110 or pressing a touch screen of device 110 that includes a graphical keyboard. Additionally or alternatively, device 110 includes a microphone that accepts, from a user, voice input that device 110 converts into voice data. Device 110 may send the input data (whether voice data or text data) to NLP service 132, which analyzes the input data to identify the one or more first attributes for the task. Instead, as noted previously, device 110 may include functionality to analyze the input data to identify the one or more first attributes for the task. (Although many of the examples herein refer to natural language processing, natural language processing is not required.)

At step 220, a task item is generated for the task based on the input data. At step 230, one or more second attributes for the task are determined based on context data that is separate from the input. Although step 230 is depicted as occurring after step 220, step 230 may occur before step 220.

At step 240, the one or more first attributes and the one or more second attributes are stored in association with the task item.

The steps of process 200 may be performed by one or multiple devices. For example, the input in step 210 may be processed at device 110 to generate the task item. In this scenario, task manager 112 (or another process executing on device 110) identifies the context data associated with the input to determine the one or more second attributes, for the task, that are not identified in the input. Task manager 112 then stores the one or more second attributes in or in association with the task item.

Alternatively, in another scenario, device 110 sends the user input over network 120 to NLP service 132. NLP service 132 accepts, as input, context data associated with the input to determine the one or more second attributes, for the task, that are not identified in the input. Context data may have been sent to NLP service 132 prior to the input that initiates the generation of the task item (in step 220). NLP service 132 sends the one or more second attributes to task manager 112 (or a task service in cloud 130). Task manager 112 stores the one or more second attributes in or in association with a newly-generated task item.

Certain words or phrases may be used to cue NLP service 132 to communicate with manager 112. For example, user commands that begin with "Remind me . . . " and "I need to . . . " are used by NLP service 132 to determine to communicate with task manager 112. In response to detecting one of those user commands, NLP service 132 analyzes the input data (from device 110) and, optionally, context data for certain types of task details, such as a location, time, description, and/or action. NLP service 132 then determines to communicate with task manager 112 and sends, to task manager 112, the task details as part of the communication(s).

Sources of Context Data

Context data associated with user input that initiates the generation of a task item may come from one of many sources. Non-limiting examples of context data include data that is or was displayed on device 110 ("display data"), data that is stored on or in association with device 110 ("personalized data"), data that is or was processed by device 110 ("process data"), data that was previously provided by a user of device 110 ("input data"), data that indicates the location of device 110 ("location data").

The following is an example of display data, or data that is or was displayed on device 110. Device 110 displays a map that includes a marker associated with a specific location on the map. A user of device 110 then says, while the map is displayed or soon after the map was displayed, "I need to be there by 5 today." NLP service 132 (or a voice analyzer on device 110) analyzes voice data that reflects the voice input. NLP service 132 analyzes data that is currently displayed on device 110 to determine what "there" refers to. NLP service 132 identifies the marker and the associated location and replaces "there" with the location. NLP service 132 sends, to task manager 112, task data that indicates 5 PM today as the completion time of the task and the specified location as the location of the task. Task manager 112 generates a task item based on the task data.

As another example of display data, device 110 displays an email that is from a particular sender and includes a subject line. A user of device 110 then says, "I need to email him about that subject in two hours." Device 110 sends voice data that reflects this input and an image of what is displayed to NLP service 132. In response, NLP service 132 identifies the email address of the sender of the email and the subject of the email. NLP service 132 sends, to task manager 112, task data that indicates a time of two hours from the current time as the completion time of the task and The following is an example of personalized data, or data that is stored on or in association with device 110. A user of device 110 says, "I will have lunch with Rachelle tomorrow at 12 noon." Device 110 sends voice data that reflects this input to NLP service 132, which identifies "Rachelle" in the voice data. NLP service 132 looks up "Rachelle" in contact data or an "address book" (stored on device 110 or in cloud 130) and determines that the last name of Rachelle is Goodwin. NLP service 132 then causes "Rachelle Goodwin" to be associated with a task item that is generated for the task. In addition to or instead of being stored on device 110, personalized data may be stored in cloud 130, i.e., remote to device 110.

The following is an example of process data, or data that was recently processed by device 110. For example, a user of device 110 used device 110 as a phone to communicate with a friend. Device 110 keeps track of who the user recently spoke with. After ending the call, the user says, "Remind me to call her back in 30 minutes." NLP service 132, in addition to analyzing the voice input, analyzes data that indicates who recently established a phone call with device 110 (e.g., the last five phone calls). NLP service 132 determines the phone number of the most recently established phone call with device 110. NLP service 132 then determines, based on contact data, that the phone number is associated with particular individual. NLP service 132 sends, to task manager 112, task data that indicates a task of calling, a time of 30 minutes from the current time as the completion time of the task, the name of the particular individual, and, optionally, the phone number of the particular individual. Task manager 112 generates a task item based on the task item.

The following is an example of input data, or data that was recently (e.g., the last 5 minutes) provided by a user of device 110. The input from the user may be text input or voice input. Device 110 or NLP service 132 keeps track of recently entered input and may use that input to determine the identity of certain terms reflected in current input. For example, a user of device 110 says, "Remind me to meet him there at 7 tonight." NLP service 132 receives voice data that reflects that voice input and identifies the terms "him" and "there." Although it is not clear who "him" is and where "there" is, NLP service 132 accesses input that was recently received from the user. Such recently-received input reflects the names "George Reed" (identified as a name of a person) and "Starbucks" (identified as a place). In response, NLP service 132 causes a task item to be generated where the task is to "Meet George Reed at Starbucks" where the time is 7 PM of the current day.

The following is example of location data, or data that indicates a location of device 110, whether current or past. A user of device 110 says, "Remind me to meet Julian here next Thursday for lunch." Device 110 sends voice data that reflects this input to NLP service 132. NLP service 132 identifies the term "here" and, in response, determines where device 110 is currently located. The current location may be determined in numerous ways. For example, device 110 may provide, to NLP service 132, a geographical location, such as longitude and latitude coordinates. NLP service 132 may then determine, based on the coordinates, a name of the place or establishment that is located at those coordinates. NLP service 132 causes a name of the place or establishment to be associated with a task item for the task to meet Julian for lunch on the date indicated.

Alternatively, the user may say, "I need to meet Josh Peters tomorrow at the same place where I was last Thursday at noon." Device 110 sends voice data that reflects this input to NLP service 132. NLP service identifies the phrase "at the same place where I was last Thursday at noon" and, in response, determines where device 110 was located last Thursday at noon. NLP service 132 accesses location history data (stored in cloud 130 or stored on device 110 and sent to NLP service 132) and determines where device 110 was located last Thursday at noon. The location history may indicate the name of a place or may consist of geographical coordinates. If geographical coordinates, then NLP service 132 determines a name of the place or establishment that is located at those coordinates. NLP service 132 causes that name to be associated with a task item for the task to meet Josh Peters on the date indicated.

Events that occur with respect to device 110 may also be used to create task items. Such events may fall into one or more categories (or types) of context data described above, such as display data, presentation data, and process data. For example, device 110 detects an incoming call and notifies the user of the call by causing a phone number or other identifying information about the call or caller to be displayed on a screen of device 110. In addition to this information, the display may include three selectable options: "Answer", "Ignore", and "Call Back Later." If the user selects "Call Back Later", then a task item is created where the task item identifies the caller and, optionally, a time of the call and/or a time to make a call to the caller. Also, the task item may be automatically categorized as a task of type "To Call."

Many of the examples herein regarding generating task items include a user providing voice or text input that includes details about a task. Another non-limiting example of how a task item may be generated is a user selecting (or highlighting) text that is displayed on a screen of device 110. The selected text is considered context data. After the text is selected, the user may be presented with one or more options, one of which is a "Remind" option which, when selected, causes a task item to be generated. Task manager 112 generates the task item based on the information reflected in the selected text. Details of the task item may be also determined from other context data, such as a time or event to trigger a notification of the task.

Virtual Dialogue

In some situations, NLP service 132 is unable to determine one or more details about a task based on input received from device 110 and the context associated with the input. Thus, in an embodiment, NLP service 132 prompts a user of device 110 for further input to determine the one or more details. The one or more details may pertain to any attribute of a task item, such as the description of the task, the location of the task, the location of a reminder (if any), or the time of the task.

For example, NLP service 132 receives, from device 110, voice data that reflects a user's command to "Remind me to call Steve at 7." NLP service 132 may have access to information (e.g., an address book) about numerous contacts, of the user, that have the name of Steve. Further, nothing in the address book can be used to disambiguate which of the Steve contacts to call. Therefore, NLP service 132 sends, to device 110, the following message to be displayed (or played audibly) by device 110: "Do you mean Steve Anderson, Steve Hanson, or Steve Jobs?" The user then provides, to device 110, voice or text input that indicates one of the three Steve contacts. In response, device 110 sends the corresponding voice or text data over network 120 to NLP service 132.

As another example, NLP service 132 receives, from device 110, voice data that reflects a user's command to "I need to pick up bread at Whole Foods." In response, NLP service 132 performs a lookup of the nearest Whole Foods stores to (a) the current location of device 110 or (b) the user's home. There may be multiple Whole Foods stores that are near device 110's current location and near the user's home. Therefore, NLP service 132 sends, to device 110, the following message to be displayed by device 110: "Which Whole Food's? The one on Almaden Rd, Chester Expressway, or Green Street?" The user then provides, to device 110, voice or text input that indicates one of the three Whole Foods stores. In response, device 110 sends the corresponding voice or text data over network 120 to NLP service 132.

As another example, NLP service 132 receives, from device 110, voice data that reflects a user's command to "Remind me to text Jerry by 8." In response, NLP service 132 determines, based on the voice data and the context of the input that Jerry is Jerry Wall, indicated in the user's contact list (or address book). However, it is unclear whether the user intended 8 AM or 8 PM as the time to send an SMS message to Jerry. Therefore, NLP service 132 sends, to device 110, the following message to be displayed by device 110: "Do you want to text Jerry Wall at 8 AM or 8 PM?" The user then provides, to device 110, voice or text input that selects one of the two times. In response, device 110 sends the corresponding voice or text data over network 120 to NLP service 132.

Autocategorization of Task Items

In an embodiment, NLP service 132 determines, based on input from a user of device 110, one or more categories to associate with a task item. The one or more categories may be one of many different categories, which may be virtually limitless. Non-limiting examples of categories with which a task item may be associated include things to purchase, things to do on vacation, things to do at work, and things to do while driving. Each category may be associated with a sub-category. For example, a "purchase category" may be divided into a grocery category indicating items to purchase at a grocery store, a book category indicating books to purchase, and a music category indicating songs to purchase.

For example, a user may provide the following voice input to device 110: "Remind me to get milk." Device 110 sends voice data that reflects that input to NLP service 132. NLP service 132 determines that a task item should be created and that "get milk" should be the description associated with the task item. NLP service 132 may also determine that milk is a grocery item and that the task item should be associated with a grocery category and/or a purchase category. Thus, NLP service 132 may send, to task manager 112, category data that indicates one or more categories with which the task item (whether created by NLP service 132, by a task service in cloud 130, or by task manager 112) should be associated.

As will be described hereinafter, the one or more categories associated with each task item may be used to organize task items that belong to the same category and display, on device 110, task items of the same category. This will allow a user of device 110 to view task items by category, in addition to or instead of by completion time, by creation time, by trigger type (described hereinafter), by location, by type (e.g., reminder task v. non-reminder task), or by some other criterion.

II. Triggering Notifications of Task Items

As noted previously, a task item may be associated with one or more triggering criteria (or triggers) that, when satisfied, causes a notification to be presented to a user of device 110 or some other action to be performed. When one or more triggering criteria of a task item are satisfied, a notification (or other action) is "triggered." Non-limiting examples of triggering criteria include time, location, relative travel time, context triggers, and exogenous triggers, each of which is described in more detail below.

Time Trigger

The time of a time trigger may be an absolute time, a relative time, a recurring time, or a symbolic deadline. An example of an absolute time is Jun. 6, 2011, 9 AM Pacific Time. An example of a relative time is "10 minutes before the Patriots-Jets football game." An example of a recurring time is "Every Thursday at LOAM." An example of a symbolic deadline is "end of business day".

Location Trigger

According to an embodiment of the invention, the location of device 110 is a triggering criterion associated with a task item. Such a triggering criterion is referred to herein as a "location trigger." The location of device 110 may be determined in one of many ways. For example, the location of device 110 may be automatically determined based on Wi-Fi positioning, cell positioning, and/or GPS (global positioning system) positioning. Device 110 may determine its current location with or without input from a service in cloud 130.

In an embodiment, a user may provide input that indicates a label to be associated with a certain geographical location. For example, a user of device 110 may speak the following sentence, "I am home" or "I am at Whole Foods." NLP service 132 may then associate the word "home" or phrase "Whole Foods" with the current location of device 110, as determined based on one of the three positioning methods mentioned previously. This association of a word with a location may be later leveraged to determine where "home" or "Whole Foods" is located.

A location trigger may not be associated with a specific geographic location or area. Instead, a location trigger may be associated with a place that is not limited to a specific geographic location or area. For example, a location trigger of a task item may be "on the road" or "while driving." Device 110 (or a process executing on device 110) determines that the current location of device 110 is on a freeway or another busy road. Thus, this determination can be made regardless of the speed at which device 110 is moving or whether device 110 is paired with another device that would indicate that the user is traveling. Based on this determination, task manager 112 analyzes one or more task items to determine whether any task items are associated with the "on the road" or "while driving" location trigger.

As another example, a location trigger of a task item may be the user's car. Specifically, the user may have provided the following voice command: "Remind me to call my mom while driving." NLP service 132 analyzes voice data that reflects that command and determines that "while driving" refers to the user's car. The user's car may have a Bluetooth-enabled component to allow device 110 to communicate with the user's car. When device 110 comes into range of a Bluetooth signal propagated by a Bluetooth-enabled component in the user's car, device 110 determines that device 110 is located in (or at least near) the user's car. In response to this determination, task manager 112 triggers the location trigger of the task item. Task manager 112 causes a reminder message to be displayed on device 110, where the reminder message informs the user to call his mother. The user may then provide a single tap or a voice response that causes a phone application executing on device 110 to initiate a call to a phone number associated with the user's mom.

While establishing a connection (or "pairing") with another Bluetooth-enabled device is one example of pairing that can be used to determine device 110's location, other types of pairings are possible. For example, device 110 may detect certain network data during the evening and morning hours. The network data indicates one or more networks to which device 110 may connect. The network data may include the names of one or more networks or MAC addresses of one or more routers. Device 110 may then determine that whenever that network data is detected, device 110 is considered to be at the user's home. Thus, actual pairing is not required since pairing entails the establishment of a connection between device 110 and another device, such as a router. As another example, device 110 may detect a Wi-Fi signal on a train, subway, or bus. The Wi-Fi signal might indicate the type of transportation that corresponds to the Wi-Fi signal. Thus, device 110 might detect, based on the Wi-Fi signal, that its location is "on a train," "in a subway," or "on a bus." If a triggering criterion of a task item indicates one or more of these locations, then an action associated with the task item may be triggered. Further, such "transit-oriented" locations may also be considered to be associated with specific contexts (described in more detail below), such as "in transit" or "while traveling." Thus, detection by task manager 112 of such contexts may cause actions associated with certain task items to be performed.

The foregoing examples of location triggers can be categorized as "arrival triggers," such as are found in user input to "Remind me to do X when I arrive at Y." Another type of location trigger is a "departure trigger," an example of which is found in the user command to "Remind me to do X when I leave work" or " . . . when I leave here." In an embodiment, in the departure trigger scenario, a minimum distance from the current location and the location of the departure is required before a particular departure trigger "fires." Such a minimum distance may be helpful to avoid the performance of corresponding actions when there are false starts.

Additionally, a location trigger may be one of multiple conditions that trigger an action of a task item. Examples of user commands that include multiple conditions include "Remind me to do X when I get home or at 8 PM at the latest," "Remind me to do X before 8 PM or when I leave, whichever is first," and "Remind me to do X before 8 PM or while I am driving, whichever is first."

Travel Time Trigger

In an embodiment, the location of device 110 and a time associated with a task item is used to provide a notification to a user of device 110. Thus, while the time may be one of the one or more triggering criteria associated with the task item, the location of device 110 may not be, at least explicitly so.

Figure 3:
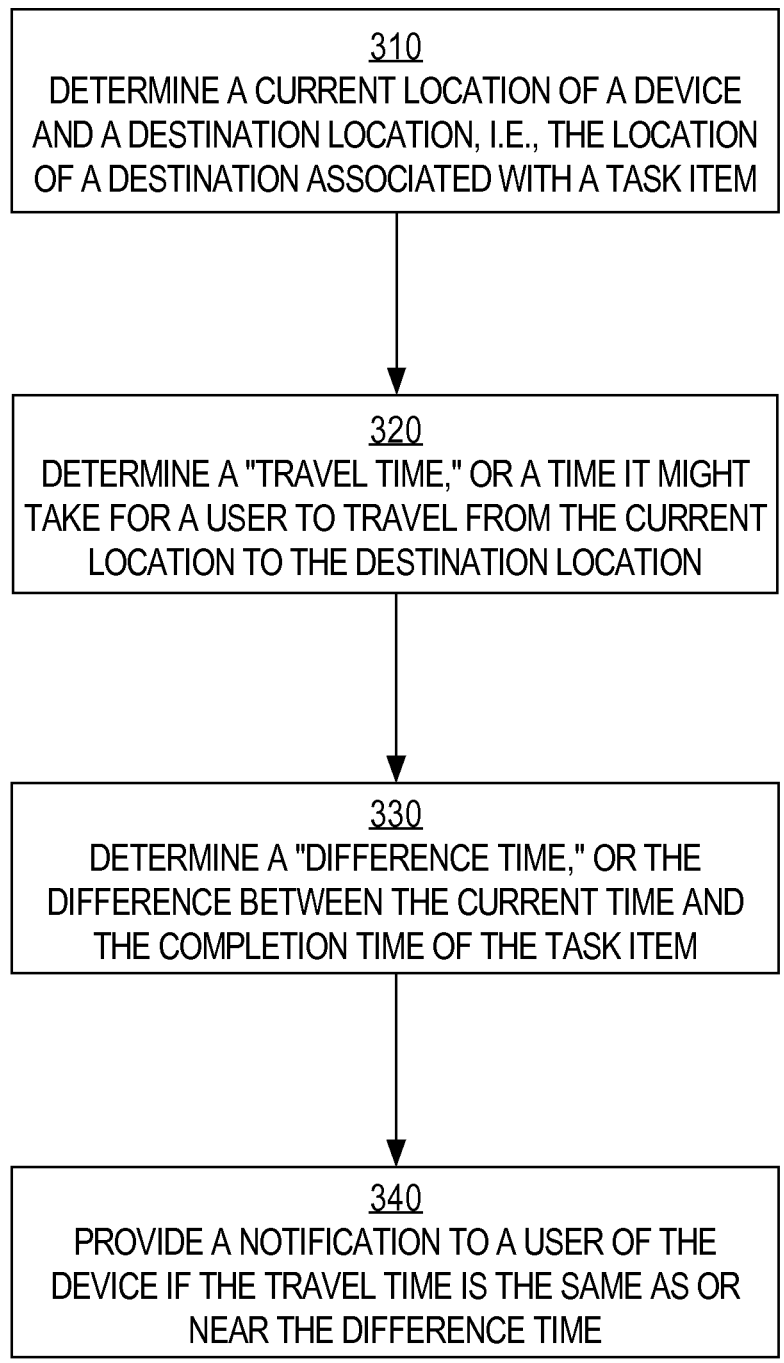
FIG. 3 is a flow diagram that depicts a process for determining a time to provide a reminder to a user ahead of a scheduled time for a task, according to an embodiment of the invention.

FIG. 3 is a flow diagram that depicts a process 300 for determining a time to provide a reminder to a user ahead of a scheduled time for a task, according to an embodiment of the invention. Process 300 may be performed by one or more processes executing on device 110 or in cloud 130. However, for ease of explanation, all the steps in process 300 are performed by task manager 112.

At step 310, task manager 112 determines a current location of device 110. At step 320, task manager 112 determines a location of a destination (or "destination location") associated with (or identify by) a task item. At step 320, based on the distance between the two locations, task manager 112 determines a "travel time," or the time it might take for the user of device 110 to travel to the destination location. At step 330, task manager 112 determines a "difference time," or the difference between the current time and the time triggering criterion associated with the task item. At step 340, if the travel time is the same as or near the difference time, then task manager 112 provides a notification to the user. This notification acts as a reminder for the user to begin (if s/he has not already done so) traveling to the destination.

For example, a task item may be for a reminder to meet Sue at a particular restaurant at 2 PM. Task manager 112 determines the location of device 110 and the location of the particular restaurant. The location of the particular restaurant may be determined by initiating, e.g., an Internet search and identifying the closest restaurant, with the same name, to device 110's location. Alternatively, an address of the particular restaurant may already be stored in association with the task item. Based on the distance between device 110's location and the particular restaurant, task manager 112 determines how long it will take for the user of device 110 to travel to the particular restaurant (or "travel time"). When the travel time is the same as or near (e.g., within 10 minutes) the difference between the current time and the time trigger (i.e., 2 PM), then task manager 112 causes, to be displayed on device 110, a message that indicates that the user should leave soon to arrive at the particular restaurant at 2 PM.

In an embodiment, the time of when to leave for a destination changes based on the current location of device 110. For example, when the current location of device 110 is at location A and the destination is at location B, task manager 112 determines that the user should begin traveling 50 minutes before the time of a scheduled task. However, in response to detecting that the current location of device 110 is now at location C, task manager 112 determines that the user should begin traveling 20 minutes before the time of the scheduled task. For example, a user of device 110 may be at home at the beginning of the day and task manager 112 determines that it will take 50 minutes to travel, from the user's home, to the location of a dinner event in the evening. Later in the day, the user of device 110 travels to work, which is closer to the location of the dinner event. In response to device 110 being at a different location, task manager 112 determines that it will take 20 minutes to travel, from the user's work, to the location of the dinner event.

In an embodiment, the time of when to leave for a destination changes based on current traffic information. For example, at 2:30 PM, task manager 112 determines that the time of when a user of device 110 should leave for a restaurant is 5:00 PM. However, due to a car accident on a freeway that the user can take to arrive at the restaurant, the traffic slows considerably. Task manager 112 determines, at 3:30 PM, that the time of when the user should leave for the restaurant is 4:00 PM.

Figure 4:
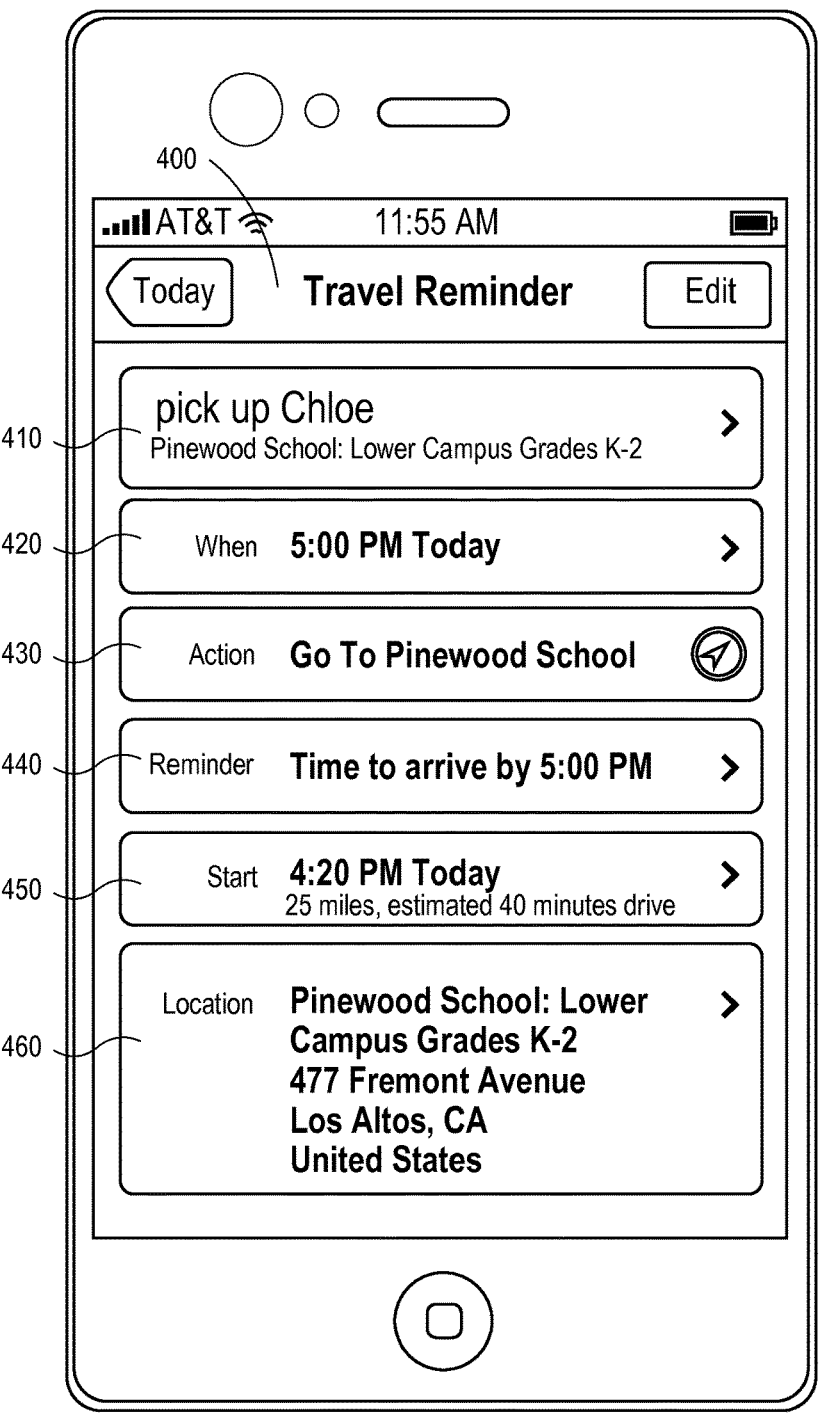
FIG. 4 is a view of a travel reminder, according to an embodiment of the invention.

FIG. 4 is a view 400 of a travel reminder, according to an embodiment of the invention. View 400 is displayed by device 110. The travel reminder of view 400 contains six data items. The six data items include: (1) a description 410 of the corresponding task ("pick up Chloe"); (2) a time 420 of when to complete the task ("5:00 PM Today"); (3) an action 430 to perform when the user of device 110 should begin traveling to the destination; (4) a reminder time 440 that indicates that the user would like to be reminded of when the user should begin traveling to arrive at the destination on time; (5) a start time 450 that indicates when the user should begin traveling to arrive at the destination on time; and (6) a location 460 that indicates a name of the destination and an address of the destination. Another travel reminder that device 110 displays may contain more or less data items.

The action associated with action 430 may be triggered (or performed) in response to task manager 112 determining that the current time (indicated at the top of travel reminder) equals the time indicated by start time 450. In the illustrated example, action 430 is a map-related action where task manager 112 causes a map to be generated at start time 450 and displayed to the user of device 110. The map includes an indication of the address of location 460, an indication of the user's current location, or both. Instead of automatically causing the map to be displayed at start time 450, task manager 112 might first cause a message to be displayed on device 110, wherein the message includes an option to generate the map. If the user selects the option (e.g., through voice input or tapping on the screen), then task manager 112 causes the map to be generated and displayed.

A reminder setting may be in an "on" or "off" mode. In FIG. 4, reminder time 440 is in an "on" mode. If reminder time 440 is in an "off" mode, then the travel reminder of view 400 might not include reminder time 440 or start time 450.

As indicated previously, task manager 112 might change start time 450 in response to changes in device 110's location. Thus, while start time 450 may indicate "3:30 PM Today" when device 110 is located at the user's home in the morning, start time 450 may indicate "4:20 PM Today" when device 110 is located at the user's work office in the afternoon.

In an embodiment, task manager 112 checks for changes in computed start time 450 in response to significant changes in device 110's location. Significant changes in location may be determined as a result of other events that are already being computed. For example, device 110 might already process events when it transitions between cell towers, and these events could trigger the re-computation of a change in location and, therefore, in an updated start time 450. Other non-limiting examples of events that indicate a potential significant change in location are changes in Wi-Fi signatures detected, the computation of accurate GPS locations for some other application (such as maps or navigation), a power cycle event, turning on or off radios on the device, alerts based on accelerometer signals, and the receipt of text messages or push notifications that contain location information.

In an embodiment, task manager 112 combines strategies for detecting significant event changes. For example, in a low power/low resolution mode, task manager 112 only checks for significant location changes every N minutes or only when some periodic computation occurs, such as checking for incoming data. In a high power/high resolution mode, task manager 112 uses cell tower positioning and/or GPS. A combined strategy might run the low power solution by default and then invoke the high power solution when the estimated start time is soon or when other events occur (for example, a change in Wi-Fi or Bluetooth signatures is detected).

In an embodiment, a travel reminder or start time item in a travel reminder may be associated with one or more modes of transportation. Non-limiting examples of modes of transportation include driving a car, riding a bus, bicycling, and walking. A default transportation mode may be driving a car. For example, task manager 112 may provide the option for a user to view start time 450 in a "car" mode, a "bus" mode, a "bike" mode, a "walking" mode, or multiple modes simultaneously. Depending on the current mode(s) selected for start time 450, the start time may vary widely. For example, in FIG. 4, while start time 450 indicates "4:20 PM Today" for a car mode, start time 450 may indicate "3:15 PM Today" for a bus mode, "3:45 PM Today" for a biking mode, and "11:30 AM Today" for a walking mode.

In a related embodiment, a task item is associated with both a location and a date/time and a notification of the task may be triggered by either the user (or, rather, the user's device) being at the location or by the date/time. For example, if the user's device is at the location, (either on the date or regardless of the date), then a notification is triggered. If the user has not arrived at the location on the day indicated by the date (or at the location by the time), then the time is used as a "last resort" for triggering a notification.

Context Triggers

As described previously, time and location are examples of types of triggering criteria associated with a task item. Another type of triggering criteria associated with a task item is context. A "context trigger" refers to one or more characteristics of device 110 other than simply the device 110's location. Thus, like context triggers, travel triggers and travel time triggers also refer to one or more characteristics of device 110.

Context triggers may be categorized into one of two types: data-oriented context triggers and spatial-oriented context triggers. Non-limiting examples of data-oriented context triggers include the kind or type of data that device 110 is displaying on its screen (e.g., video), the specific application(s) or type of application(s) that are currently executing on device 110 (e.g., a texting application or a music application), the type of input device 110 is receiving from a user (e.g., voice or data), and the type of network connections available to device 110 (e.g., Wi-Fi or cellular network).

For example, a user command that device 110 receives may be "Remind me to call my mom next time I am on the phone." The phrase "on the phone" is presumed to mean that when the user is using device 110 as a phone, a reminder will be sent to the user to inform the user to call his/her mom.

As another example, a user command that device 110 receives may be "I need to email Bob when I am surfing the Internet." The phrase "surfing the Internet" is presumed to mean that when the user is interacting with a web browser on device 110, the context of device 110 (or of the user) is "when online." In response to determining the context of the device or of the user, a reminder will be sent to the user to inform the user to email Bob. Additionally another reminder may be provided to the user for any other task items that are associated with the "when online" context trigger.

As another example, a user command that device 110 receives may be "Text Mom when I am talking to my sister Sarah." The phrase "when I am talking to my sister Sarah" is presumed to mean that when the user is using device 110 as a phone and a phone call is established with Sarah, a reminder will be sent to the user to remind the user to send a text (or SMS) message to the user's mother.

As another example, a user command that device 110 receives may be "Remind me to email Jane Smith when I have a Wi-Fi connection." In response to device 110 detecting a Wi-Fi signal that does not require a password or that requires a password accessible to device 110, task manager 112 causes a notification to be displayed on a screen of device 110, where the notification indicates that Jane is to email Jane Smith.

Non-limiting examples of spatial-oriented context triggers include the speed at which device 110 is moving (e.g., over 30 mph indicating driving, or less than 3 mph indicating walking), a direction (absolute or relative) at which device 110 is moving, and a set of movements of device 110 (e.g., short vertical movements while moving continuously in a horizontal direction). In other words, device 110 may be configured to detect how device 110 is moving through space.

For example, device 110 (or rather a process executing on device 110) determines, based on detecting changes in its location over a period of time, that device 110 is moving at 60 mph. Based on this information, device 110 determines that the device's context is "while driving" or "on the road." Task manager 112 analyzes one or more task items to determine whether any task items are associated with a "while driving" or "on the road" context trigger. If a task item is associated with a "while driving" or "on the road" context trigger, then an action (e.g., displaying a notification) associated with the task item is performed.

As another example, device 110 determines, based on detecting changes in its location over a period of time, that device 110 is moving towards his home over a certain period of time (e.g., 5 minutes). Based on this information, device 110 determines that the context is "on my way home." Task manager 112 analyzes one or more task items to determine whether any task items are associated with a "on my way home" context trigger. If a task item is associated with a "on my way home" context trigger, then an action (e.g., displaying a notification) associated with the task item is performed.

As another example, device 110 includes an accelerator that detects certain repetitive movements. Device 110 may determine, based on these repetitive movements over a period of time, that the user of device 110 might be running at a slow pace. Based on this determination, device 110 determines that the context is "while jogging." Task manager 112 analyzes one or more task items to determine whether any task items are associated with a "while jogging" or "while walking" context trigger. If a task item is associated with a "while jogging" or "while walking" context trigger, then an action (e.g., displaying a notification) associated with the task item is performed.

As another example, device 110 might detect that it has not moved for a period of time (e.g., 3 hours). A user of device 110 might be interested in being alert and non-movement of device 110 might indicate that the user is asleep. Thus, the user might issue the command, "Alert me if the phone doesn't move for 3 hours."

In addition to data-oriented and spatial-oriented triggers, other kinds of triggers may be based on any sensor on device 110. Device 110 may include multiple sensors, such as temperature sensors and light sensors. For example, device 110 might include a thermometer for detecting the outside temperature or an internal temperature of device 110. Thus, a user of device 110 might issue the command, "Remind me to call Harold when it reaches 100 degrees."

Exogenous Triggers

Another type of triggering criteria that may be associated with a task item is exogenous criteria. An "exogenous trigger" is a triggering criterion that depends on one or more factors that exist outside and separate from device 110 and the user of device 110. Such factors may be considered "events" that occur with respect to devices other than device 110 or with respect to data that is stored on one or more devices other than device 110. Non-limiting examples of exogenous triggers include social location, social proximity, standing queries, and local events.

An example of a social location trigger is when a friend or associate of the user of device 110 arrives or leaves a certain location. For example, a user command that initiated the creation of a task item may have been "Notify me if Sarah leaves the mall." Thus, the location of Sarah (or Sarah's mobile device) is an essential factor in setting off this type of exogenous trigger. Specifically, task manager 112 determines the current location of Sarah's device. The current location of Sarah's device may be provided by a cloud service (e.g., in cloud 130) to which both Sarah's device and device 110 are subscribed. Device 110 receives, from the cloud service, updates as to the location of Sarah's device. Task manager 112 uses that location information to determine whether the social location trigger should be activated. A similar user command is "Remind me when my daughter gets home."

An example of a social proximity trigger is when a friend or associate of the user of device 110 is within a certain distance of the user (or device 110). For example, a user command that initiated the creation of a task item may have been "Remind me to call George when he is within 100 feet of me." Thus, the location of George (or George's mobile device) is an essential factor in setting off this exogenous trigger. Specifically, task manager 112 or another process executing on device 110 compares the current location of device 110 with the current location of George's device to determine the distance that separates the two devices. Alternatively, George's device may transmit its location to a cloud service to which both George's device and device 110 are subscribed. Device 110 receives, from the cloud service, updates as to a distance between George's device and device 110. Task manager 112 uses that distance information to determine whether the social proximity trigger should be activated.

An example of a standing query trigger is when a webpage mentions a particular term or phrase, such as a company name. To detect this, a standing query is generated and issued continuously (e.g., once a day). For example, a user command that initiated the creation of a task item may have been "Tell me when cnn.com mentions Berkman Industries." Task manager 112 or another process executing on device 110 issues a search query (e.g., to a search engine) and receives results. When task manager 112 determines that the results include a webpage from cnn.com that includes the name "Berkman Industries," task manager 112 provides a notification to the user of device 110.

An example of a local event trigger is when a certain local event occurs. To detect this, task manager 112 receives data from an online service. Task manager 112 (or a task service in cloud 130) may periodically send a request to the online service (via one or more communication protocols). Alternatively, task manager 112 may subscribe with the online service to receive information about certain events. For example, a user command that initiated the creation of a task item may have been "Tell me when Beatles tickets go on sale at Shoreline." In response, task manager 112, another process executing on device 110, or NLP service 132 sends a subscription request to an online ticket service to receive a notification when Beatles tickets for a performance at Shoreline Amphitheatre become available for purchase. When task manager 112 is determines Beatles tickets are available for purchase, task manager 112 provides a notification to the user of device 110.

As another example, a user might be interested in knowing when the surf is up. Thus, the user might issue the command, "Remind me an hour before the surf is up." Task service 112 (or a task service in cloud 130) might regularly issue a query of a surfing site or might subscribe for alerts from the surfing site.

Based on the foregoing, the types and examples of exogenous triggers are virtually endless. As long as task manager 112 (or a task service in cloud 130) can make a determination about an event that occurs separate from device 110, that event can be used to trigger the performance of an action associated with a task item.

III. Consuming Task Items (Active Payloads)

A task item is "consumed" when an action associated with the task item is performed. Such an action may be a notification that is displayed (or played, if the notification is an audio notification) on device 110. In addition to or instead of providing a notification to a user of device 110, other possible actions include initiating a phone call or a search query, sending an HTTP request (that includes a Uniform Resource Location (URL)), sending an email or a text (SMS) message, causing an application to execute, and causing a purchase to be made on the user's behalf. Such actions that can be associated with task items are referred to as "active payloads." The processing of an active payload causes some action to be performed, whether by task manager 112 or by another process, whether local or remote to device 110. In other words, instead of simply notifying the user of a task associated with a task item, task manager 112 (or a service in cloud 130) can automate the action part of the task item.

As alluded to above, causing an action to be performed may involve task manager 112 causing another application or process to perform the action. The calling or invoking of the other application (e.g., via an API of the other application) may be performed with or without further input, as indicated in the following examples.

The types of "other" applications can vary greatly. Non-limiting examples of applications that might be available on device 110 include a phone application, an email application, a Web browser, a music player application, a media player application, a music download application, an image processing application, a geopositioning application, a contacts application, an SMS application, a video game application, and a text processing application.

For example, a user of device 110 says aloud, "Remind me to call her back this afternoon." This voice input is converted into voice data that device 110 sends (along with context data) over network 120 to NLP service 132. NLP service 132 analyzes the voice data and the context data to determine that "her" refers to Marilyn Merlot. NLP service 132 determines that "afternoon" is 2 PM (whether based on context data, a pre-defined setting, or prior history) and determines a phone number for Marilyn Merlot based on a contacts list (or address book), associated with the user, that includes one or more phone numbers for Marilyn Merlot. The contacts list may be stored on device 110 or in cloud 130. NLP 132 sends, to task manager 112 (or to a task service in cloud 130), reminder data used to generate a task item. The reminder data includes the date of "Today", time of 2 PM, and an instruction to call Marilyn Merlot using a particular phone number. When task manager 112 determines that the current time is 2 PM, task manager 112 may cause a message to be displayed that prompts the user to call Marilyn Merlot. The message may include a "Later" button and a "Call Now" button. If the user selects the "Later" button, then task manager 112 will send the message again later in the afternoon (e.g., in 1 hour). If the user selects the "Call Now" button, then task manager 112 initiates a call to Marilyn Merlot. This initiation may involve task manager 112 making an API call to a phone application (not shown) executing on device 110 and passing the phone number as an argument of the API call. The phone application then uses the phone number to call a device associated with the phone number.

As another example, a user of device 110 says aloud, "Text Lindsay that I love her at 5 o'clock." This voice input is converted into voice data that device 110 sends over network 120 to NLP service 132. NLP service 132 analyzes the voice data to determine that a cell phone number of Lindsay is necessary and that "5 o'clock" refers to 5 PM of the current day. Task manager 112 (or a task service in cloud 130) creates a task item that includes the following data items: (1) a completion time of 5 PM today, (2) an action of sending a text (or SMS) message, (3) a number of Lindsay's cell phone, and (4) a text string of "I love you" that will be part of the text message. In response to determining that the current time is 5 PM, task manager 112 analyzes the task item to determine the action that needs to be performed. Task manager 112 then causes a text message that includes the text string associated with the task item to be sent to Lindsay's cell phone. This step may comprise task manager 112 invoking an API call of a texting application (not shown) executing on device 110, where the text string ("I love you") is an argument of the API call.

As another example, a user of device 110 says aloud, "Show me directions on how to get to Rachel's Restaurant in San Jose when I leave the office." This voice input is converted into voice data that device 110 sends over network 120 to NLP service 132. NLP service 132 analyzes the voice data to determine that a cell phone number of Lindsay is necessary and that "5 o'clock" refers to 5 PM of the current day. Task manager 112 (or a task service in cloud 130) creates a task item that includes the following data items: (1) a location trigger of leaving the user's office and (2) an action of displaying instructions (and, optionally, a map) on how to arrive at Rachel's Restaurant from the user's office. In response to determining that the user of device 110 has left his/her office, task manager 112 analyzes the task item to determine the action that needs to be performed. Task manager 112 then causes (without further input from the user) a travel directions request to be sent to a travel directions service. The travel directions request includes the name of the restaurant, any address information of the restaurant, or both. The travel directions service may be hosted on device 110 or on another device (not shown).

As another example, a user of device 110 says aloud, "Order a cheese only pizza at Pizza Heaven in San Jose, home delivered, 30 minutes before the Bulls-Pacers game starts." This voice input is converted into voice data that device 110 sends over network 120 to NLP service 132. NLP service 132 analyzes the voice data to determine that a Bulls-Pacers game starts at 6 PM local time; thus, the time trigger is 5:30 PM local time. NLP service 132 also determines that Pizza Heaven in San Jose allows online ordering. Task manager 112 (or a task service in cloud 130) creates a task item that includes the following data items: (1) a time trigger of 5:30 PM and (2) an action of ordering a cheese only pizza from Pizza Heaven with home delivery as an option. In response to determining that the current time is 5:30 PM, task manager 112 (or a task service in cloud 13) analyzes the task item to determine the action that needs to be performed. Task manager 112 then causes a pizza order request to be sent to Pizza Heaven's online ordering service. The pizza order request includes the pizza type of cheese only, the delivery option of home delivery, and the user's home address. The pizza order request may be in the form of an API call to the online ordering service, where arguments of the API call include indications of cheese only topping, home delivery, and the user's home address. Alternatively, before causing the pizza order required to be sent, task manager 112 may formulate a message that is displayed on (or played by) device 110, where the message informs the user about this task. If the user provides affirmative input, then task manager 112 causes the pizza request order to be sent. If the user provides negative input, then no pizza request order is sent.

As another example, a user of device 110 says aloud, "Play my classical station on Pandora at 3 PM tomorrow." The time of "3 PM tomorrow" coincides with the end of a scheduled exam for the user. This voice input is converted into voice data that device 110 sends over network 120 to NLP service 132. NLP service 132 analyzes the voice data to determine a date and time that the intended action is going to be performed. Task manager 112 (or a task service in cloud 130) creates a task item that includes the following data items: (1) a time trigger of 3 PM with a date that identifies the following day and (2) an action of playing a classical "station" of the user's Pandora music application, where the classical station was established by the user and associated with the user's Pandora account. In response to determining that the current time is 3:00 PM on the proper date, task manager 112 (or a task service in cloud 13) analyzes the task item to determine the action that needs to be performed. Task manager 112 then causes the Pandora music application (not shown) to begin executing on device 110 and to "play" the user's classical station. Task manager 112 may cause the classical station to play by invoking an API call to the Pandora music application, where an argument of the API call includes an indication of a classical station.

Automated Task Completion

In an embodiment, task manager 112 (or a task service in cloud 130) "marks" the task item as complete in response to detecting that a task item is consumed. In other words, a task item may be associated with a complete or an incomplete status. Task manager 112 may provide an interface for a user to view task items managed by task manager 112 and determine whether a task item is complete or not. Task manager 112 may provide an option for a user of device 110 to view all completed task items. The completed task items may be ordered based on when the task items were created, consumed (or completed), or some other criteria.

Additionally or alternatively, task items that are consumed are deleted from storage. For example, task manager 112 deletes, from storage on device 110, any task items that have been consumed. The deletion of a task item may occur a certain period of time (e.g., 1 month) after the corresponding task has been completed to allow a user of device 110 to review recently-consumed task items. If a task service in cloud 130 manages task items that are stored in cloud 130, then that task service may delete consumed task items.

Delayed Task Interpretation

In an embodiment, when a task item is created, only some details of the corresponding task may be known and stored in association with the task item. Other details regarding the description, address (if any), trigger, and/or action may be determined later, whether automatically or via a manual process.

For example, device 110 sends, to NLP service 132, voice data that reflects a user command to "Call Sarah at 5." NLP service 132 determines that 5 PM of the current day is a time trigger and causes task manager 112 (or a task service in cloud 130) to create a task item with that time trigger. However, an action item associated with the task item is "Call Sarah" without any indication of a phone number. NLP service 132 has not yet determined who Sarah is and, thus, what phone number to use to call her. Instead, those details are determined later; for example, when the current time is 5 PM and the action is triggered or sometime before the trigger activates. At 5 PM, task manager 112 sends the action item "Call Sarah" (whether in text form or audio form) to NLP service 132 or another service to identify information about a particular Sarah (if there are many) and to determine a phone number for Sarah. When a phone number for Sarah is determined, task manager 112 (or another process) causes a phone application on device 110 to initiate a call using the phone number. In this example, the disambiguation of (a) the identity of an individual and (b) a phone number for that individual is delayed until after the task item is generated.

As another example, device 110 sends, to NLP service 132, voice data that reflects a user command to "Check the weather in San Jose tomorrow morning." NLP service 132 determines that 7 AM of the next day is a time trigger and causes task manager 112 (or a task service in cloud 130) to create a task item with that time trigger. However, an action item associated with the task item is "Check the weather in San Jose" without any indication of how to perform the action. NLP service 132 has not yet interpreted that portion of the user command to determine how the weather in San Jose is to be checked. Instead, those details are determined later; for example, when the current time is 7 AM of the next day and the action is triggered or sometime before the trigger activates. At 7 AM of the next day, task manager 112 sends the action item "Check the weather in San Jose" (whether in text form or audio form) to NLP service 132 or another service to identify how the weather in San Jose is to be checked. In response, NLP service 132 or another service retrieves information about the weather in San Jose and provides that information to device 110 to be displayed. In this example, the determination of how the action is to be performed is delayed until after the task item is generated.

Response to Alert

As alluded to previously, for a task item that is associated with an action that is more than a mere notification, instead of performing the action, a user of device 110 is first alerted of a task and the user is allowed to respond with an affirmative or negative response. For example, an action of a task item is to email Jane Smith about Project Knuckles. Task manager 112 causes, to be displayed on device 110, a message that indicates that the user of device 110 is suppose to email Jane Smith. The user may press a physical or graphical button that indicates an affirmative response. Alternatively, the user may speak the command, "Do it" or "Yes" indicating an affirmative response. In response to the input (whether via a touch screen of device 110, a keyboard selection, or voice input), task manager 112 causes an email application on device 110 to compose an email message addressed to Jane Smith with a subject line that refers to Project Knuckles. Alternatively, the user may decide to be reminded later of the task to email Jane Smith. Thus, in response to the notification, the user provides input (via device 110) that indicates that s/he would like to email Jane Smith some time later, such as in one hour or the next day. Such input may be the user saying "Remind me later" or simply "later."

In an embodiment, when the action is to respond to an act of communication such as an email message, task manager 112 stores the context of the communication at the time of task creation and retrieves the context at the time of performing the action. The context of communication might be, in various embodiments, a Universal Resource Identifier or other reference to the context or a copy of the data of the context. For example, task manager 112 stores a reference to or copy of the email message that is to be replied to. When the action is performed, the contents of the email message can be recreated just as if the user had performed a reply when initially reading it. Other examples of context data that can be stored and retrieved in this manner include without limitation text messages, documents, web pages, voicemail messages, photographs, audio recordings, and videos.

As another example, an action of a task item is to call George Burt. In response to determining to trigger the action to call, task manager 112 provides an indication that a reminder is available for a user of device 110. The indication may be device 110 buzzing/shaking, generating an audible noise, and/or displaying a notification message. Without holding device 110, the user says aloud, "Read it." In response to task manager 112 (or another process) processing this input, device 110 plays an audible version of the following statement: "Reminder . . . call George Burt." The audible version may be based on a playback of the original input from the user or may reflect a computer-generated voice. If the user decides to call George Burt, then the user may simply say, "Okay" or "Do it," which causes a phone application on device 110 to call George Burt. If the user decides not to call George Burt, then the user may say, "Ignore" or "remind me later."

IV. Organizing Task Items Using Lists

According to an embodiment of the invention, a task item may be associated with one or more lists. A list is a set of one or more task items that are associated with (or belong to) the same category. Lists are ways that a user of device 110 can view task items in an organized way. The different lists allow the user to intelligently and intuitively browse the tasks that s/he would like to perform (or have performed on his/her behalf). FIGS. 6-14 depict views of various types of lists, according to an embodiment of the invention.

When a new task item is created, task manager 112 (or a service in cloud 130) identifies one or more attributes associated with the new task item and assigns the new task item to one or more lists. For example, if the new task item includes the action "to call," then task manager 112 (or other process) adds the new task item to a To Call list. Similarly, if the new task item includes a certain context and a particular location, then task manager 112 might identify the context and/or the particular location and add the new task item to a location list and/or a context list. Alternatively, a user might manually identify one or more of the lists, which are described in detail below, to which a new task item is to be added.

All Lists View

Figure 5A:
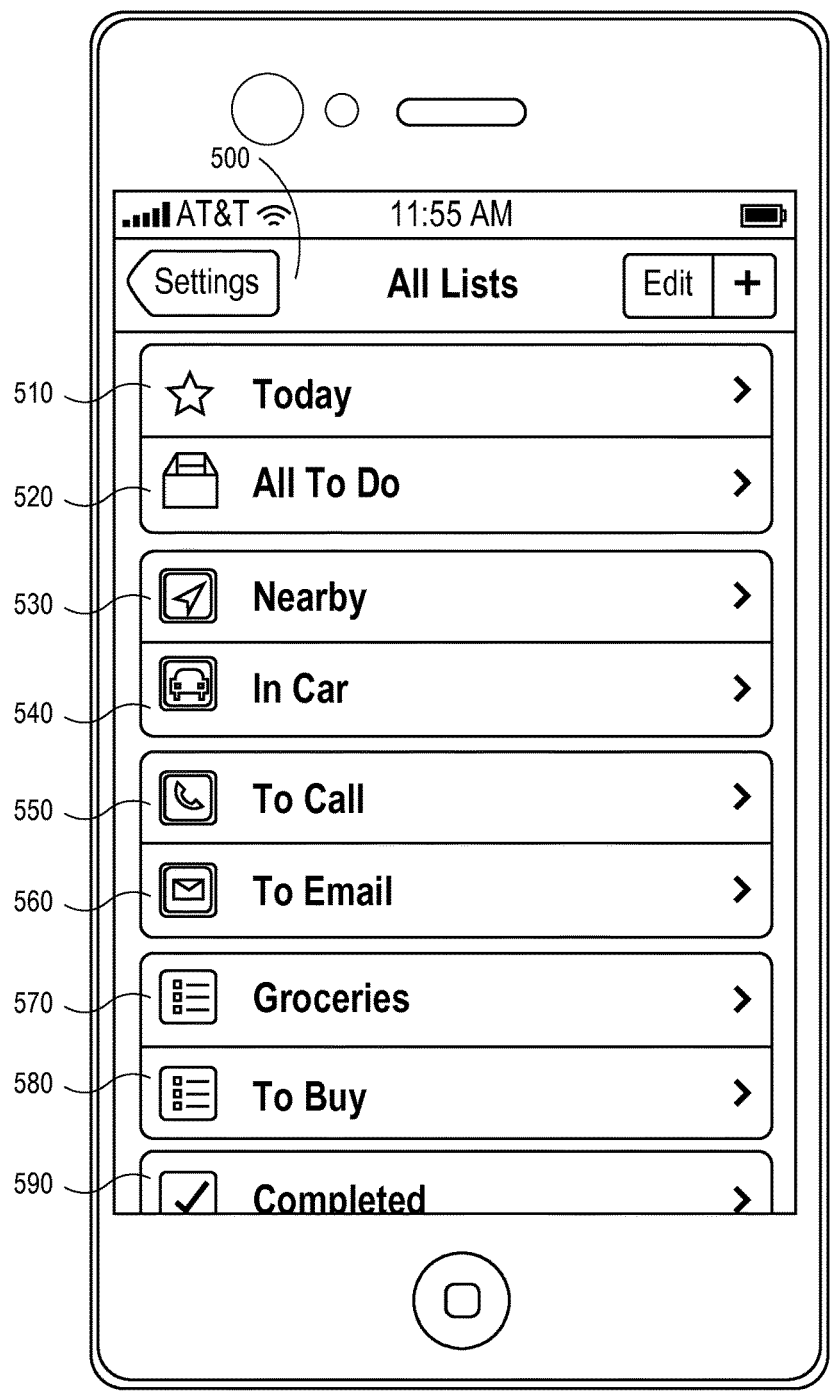
FIGS. 5-15 depict views of various types of lists, according to an embodiment of the invention.

FIG. 5A depicts an All Lists view 500 that device 110 might display, according to an embodiment of the invention. All List view 500 does not contain information about any specific task items. Instead, All Lists view 500 includes references to multiple lists maintained by task manager 112 (or a task service in cloud 130): a Today list 510, an All To Do list 520, a Nearby list 530, an In Car list 540, a To Call list 550, a To Email list 560, a Groceries list 570, a To Buy list 580, and a Completed list 590. As noted previously, a task item may be associated with (or belong to) multiple lists. For example, a task item whose description is to buy milk and whose time trigger is today may belong to Today list 510, All To Do list 520, Groceries list 570, and To Buy list 580.

Lists may be characterized as one of three types: built-in or predefined list, smart list, or custom list. Today list 510, All To Do list 520, and Completed list 590 are examples of built-in or pre-defined lists.

Smart lists are based on different characteristics or attributes that a task item might have, such as an action (e.g., call, email, text, alert), a location, and/or a context in which the action is to be performed. Examples of smart lists include By Action lists, By Location lists, and By Context lists. In Car list 540, To Call list 550, and To Email list 560 are examples of By Action lists. Other examples of By Actions lists might include a To Text list, a To Lookup list, and a To Visit list.

Examples of custom lists include lists that are based on categories identified by NLP service 132 and lists that are created by a user. Groceries list 570 and To Buy list 580 are examples of custom lists. Another example of a custom list is a wine list (not shown) that includes a list of the user's favorite wines.

Returning to the lists depicted in FIG. 5A, task items that belong to Today list 510 are associated with a triggering criterion that indicates a time during the current day that the corresponding task must or should be performed. All task items belong to All To Do list 520. Task items that belong to Nearby list 530 are associated with locations that are considered to be within a certain distance (e.g., 1 mile) from the current location of device 110. Task items that belong to In Car list 540 are associated with tasks that are to be performed in a car or while traveling. Task items that belong to To Call list 550 are associated with the action to call a person or entity. Task items that belong to To Email list 560 are associated with the action to email a person or entity. Task items that belong to Groceries list 570 are associated with grocery items (e.g., milk, eggs, fruit) to purchase. Task items that belong to To Buy list 580 are associated with items to purchase, such as clothing, books, songs, or groceries. Task items that belong to Completed list 590 are considered completed, which may indicate that the corresponding tasks have been performed or at least that an action (e.g., an alert or notification) associated with each task item has been performed.

All Lists view 500 also includes a "+" image that when selected, allows a user of device 110 to create another custom list so that current and/or future task items can be added thereto.

Figure 5B:
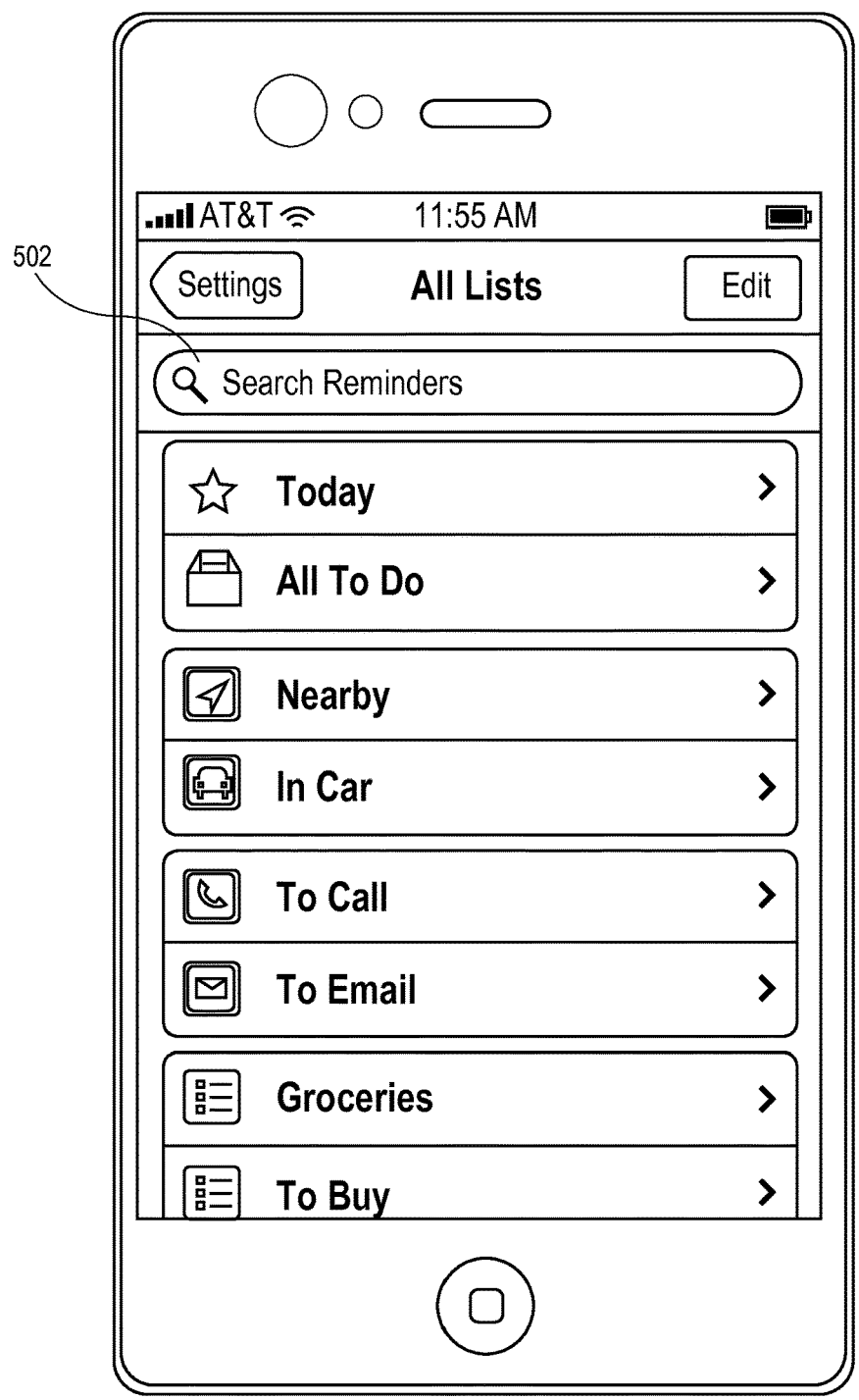

FIG. 5B depicts some of the lists depicted in FIG. 5A, but with a search field 502 to allow a user of device 110 to search for a specific task item. A task item may be searched for based on, for example, the task item's associated creation date, completion date (if known), completion status, context trigger (if any), location (if any), and/or action type (e.g., notify only, call, email, or buy).

Today List

Figure 6:
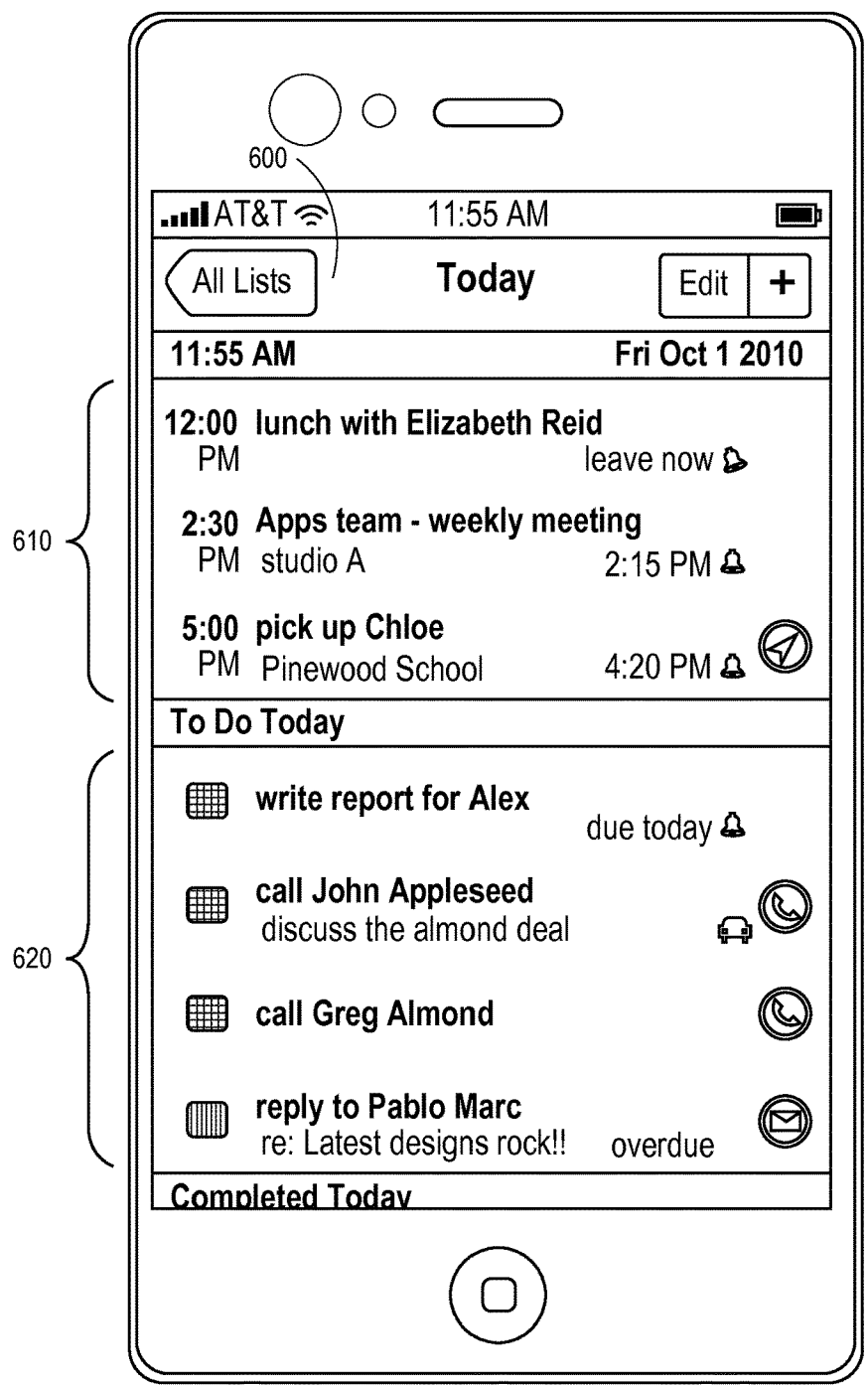

FIG. 6 depicts a view 600 of a Today list that device 110 displays, for example, in response to user selection of Today list 510. View 600 includes a list of tasks that are divided into two sections: a section 610 for task items that are associated with a specific time and a section 620 for task items that are not associated with a specific time. Each of the task items in section 610 is associated with a travel time reminder. The third task item in section 610 and the second through fourth task items in section 620 are associated with actions that are more than mere reminders or alerts.

For example, the third task item in section 610 is to "pick up Chloe" at 5:00 PM. The icon to the right of that description is an image of a compass, indicating that the action associated with this task item is to generate travel directions to help guide the user of device 110 to the intended destination, which is Pinewood School in this example.

As another example, the second task item in section 620 is to "call John Appleseed." The icon to the right of that description is an image of a phone, indicating that the action associated with this task item is to call John Appleseed. The image adjacent to the phone image is of a car, indicating that the user of device 110 is to call John Appleseed when the user is in a car or while the user is traveling.

As another example, the last task item in section 620 is to "reply to Pablo Marc." The icon to the right of that description is an image of an envelope, indicating that the action associated with this task item is to send an email to Pablo Marc. View 600 also indicates that this task item is overdue, or rather, that the originally-scheduled time to email Pablo Marc has passed.

Single Task Item View

Figure 7:

FIG. 7 depicts a view 700 that device 110 displays and that includes details about a particular task item. View 700 may have been generated based on a user selection of the second task item in section 620 in view 600 of FIG. 6. The displayed task item contains four data items: a description item 710, an action item 720, a reminder item 730, and a list assignment item 740.

Description item 710 contains a high-level description of the task ("Call John Appleseed") and includes details about the subject matter ("Discuss the almond deal"). Selection of description item 710 may allow a user of device 110 to edit the description.

Action item 720 contains a description of the action ("Call") and includes which phone ("mobile") of John Appleseed to use. Selection of action item 720 may allow the user of device 110 to view the phone number associated with John Appleseed and/or provide other contact options, such as another phone number associated with John Appleseed, an email address of John Appleseed, etc. Furthermore, selection of the phone icon in action item 720 may cause task manager 112 to initiate a call phone to John Appleseed right then instead of waiting for the one or more triggering criteria associated with the task item to be satisfied.

Reminder item 730 indicates the type of trigger ("when in car") that, when detected, will cause the action to be performed, or at least an alert about the task. Selection of reminder item 730 may allow a user to change the type of reminder.

List assignment item 740 indicates the list to which the task item belongs, which is the "Nut to Crack Project" list in this example. This list is an example of a customized list. Selection of list assignment item 740 may cause device 110 to display multiple task items that belong to the "Nut to Crack Project" list.

All to do List

Figure 8:
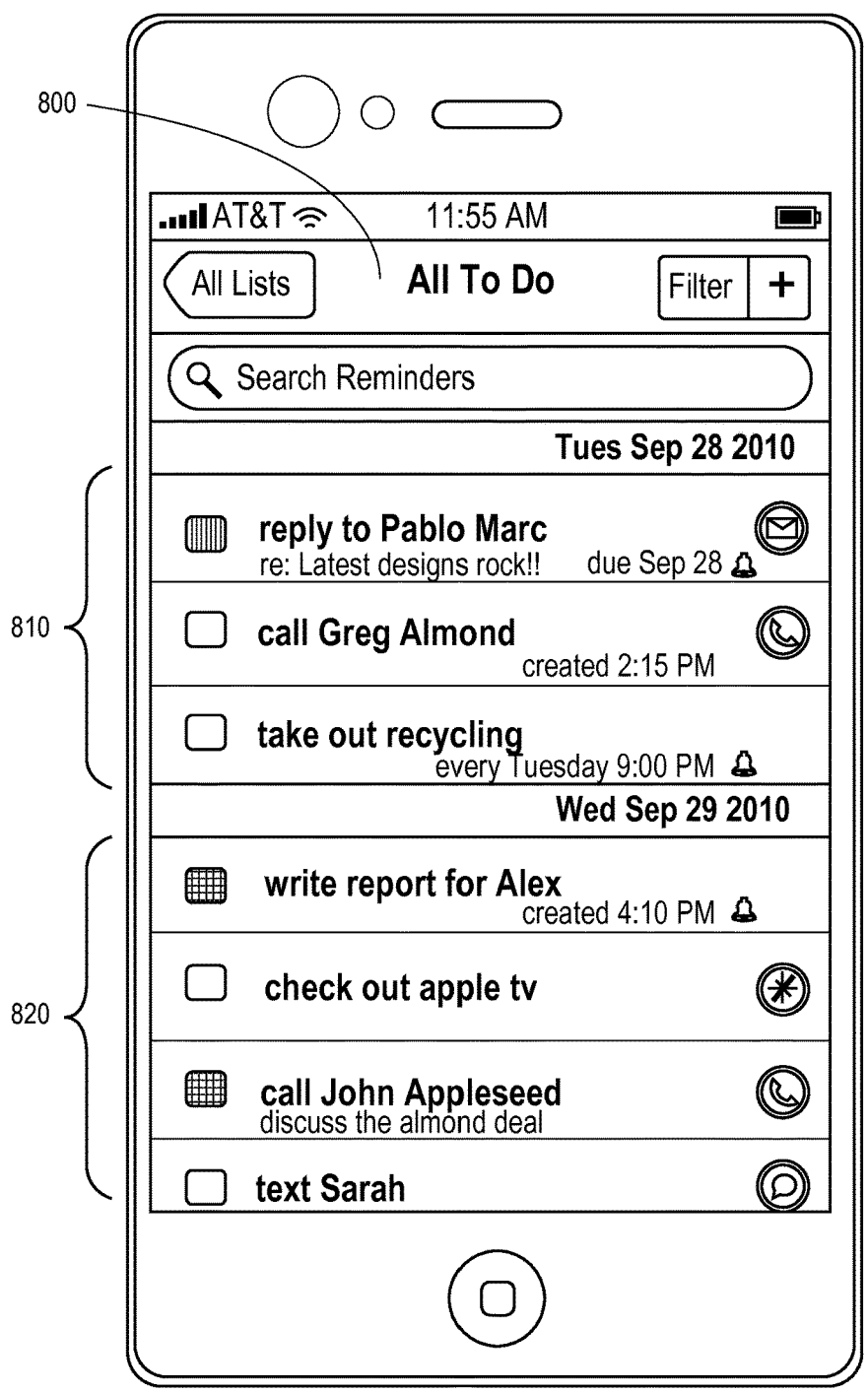

FIG. 8 depicts a view 800 of an All To Do list that device 110 displays and that includes information about multiple task items. In this example, the multiple task items are ordered by date. View 800 may have been generated based on a user selection of All To Do list 820 in view 800 of FIG. 8A. View 800 is divided into two sections: section 810 that contains task items (or references thereto) to be completed on one day and section 820 that contains task items to be completed on the following day.

Some of the task items referenced in view 800 have been completed. Such completed task items are shown with a lighter gray image to the left of the corresponding description. Task items that have been completed may be distinguished from not-yet-completed task items by other techniques, such as check marks.

In the example depicted in FIG. 8, the task items are organized by the date on which the corresponding tasks should be performed (or "due date"). However, the task items referenced in view 800 may be organized by the date on which a user of device 110 is to be alerted or reminded of the corresponding tasks ("alert date"), the date on which the task items were created ("created date"), the date on which the task items were modified ("modified date"), or the date on which the corresponding tasks were performed ("completed date").

Nearby List

Figure 9:
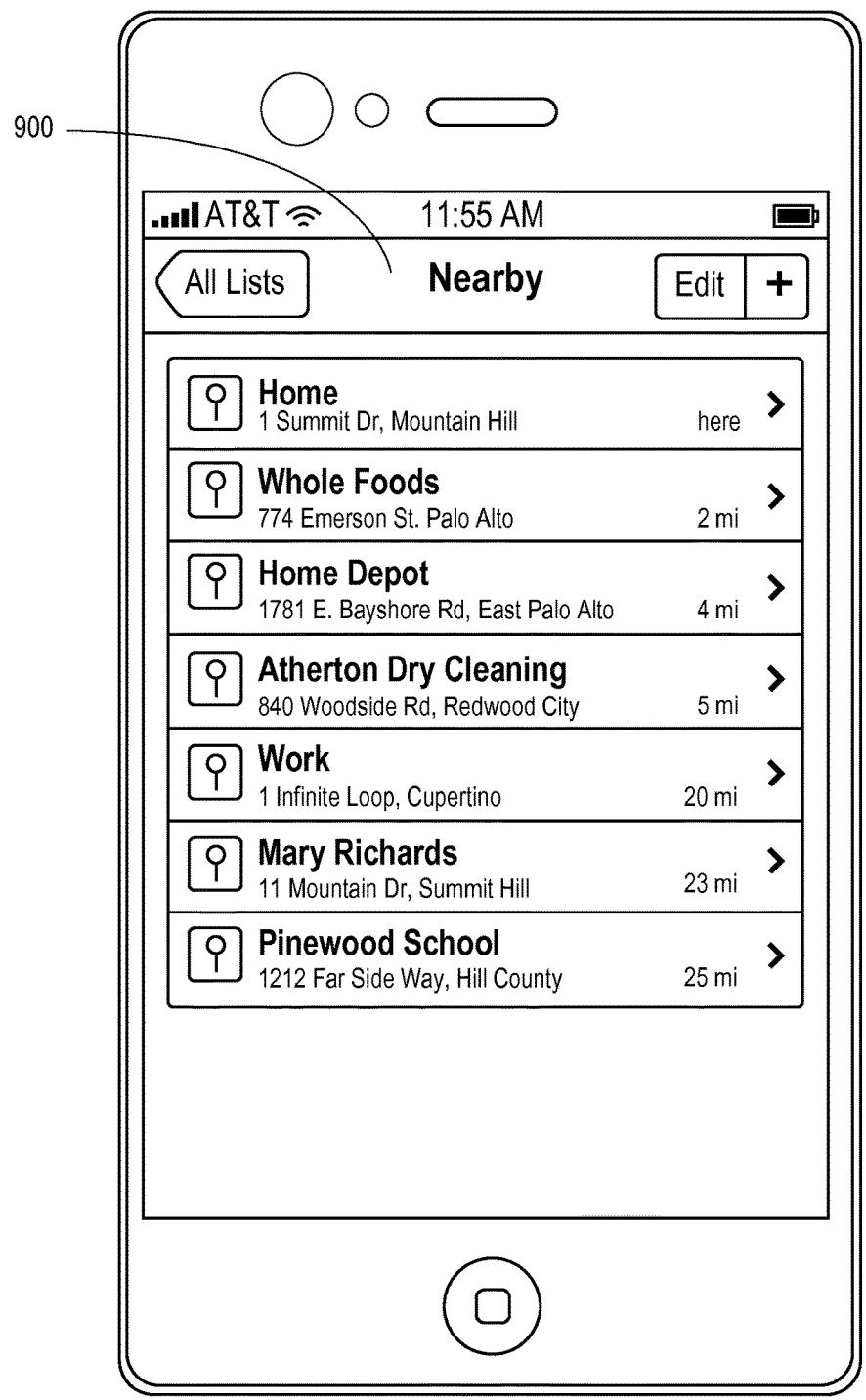

FIG. 9 depicts a view 900 of a "Nearby" list that device 110 displays. View 900 may have been generated based on a user selection of Nearby list 830 in view 800 of FIG. 8A. View 900 contains information about multiple locations that are ordered based on distance from device 110's current location. The location indicated at the top of the list ("Home") is closest to the current location of device 110 while the location indicated at the bottom of the list ("Pinewood School") is furthest from the current location of device 110.

Each location indicated in view 900 is associated with a different location list. Each location list may be associated with one or more task items. For example, the "Home" location may be associated with four task items (which may be displayed on user selected of the "Home" location) while the "Atherton Dry Cleaning" location may be associated with just one task item.

Because the locations indicated in view 900 are ordered based on distance from the current location of device 110, when the current location of device 110 changes, the location indicators may be re-ordered, some may be removed from view 900, and others not currently displayed in view 900 may appear in view 900. For example, if device 110 is currently located in a store that is next to the Whole Foods store identified by the second location indicated in view 900, then, if device 110 displays view 900, that Whole Foods location indicator will be at the top of the list.

As indicated above, view 900 includes a "Home" location and a "Work" location. The association of a location labeled "Home" (or "Work") with a particular address may be made in numerous ways. For example, many mobile devices store profile information about a user of the mobile device. This information is referred to as a "me card." A me card typically stores a user's home address and the user's work address. Thus, task manager 112 (or another process) analyzes the me card that is stored on device 110 to determine a home address and a work address (if any) of the user.

In an embodiment, a radius is associated with a particular location and any task items that are associated with a location that is within the distance indicated by the radius is considered to be associated with the particular location. For example, a radius associated with a home of a user of device 110 is 2 miles. If a task item is associated with a park and the park is within 2 miles from the home, then the task item is associated with a "home" list, along with other task items that are associated with the home.

Location List View

As noted previously, a location list is an example of a smart list. In an embodiment, any task item that is associated with a location (e.g., as part of the one or more triggering criteria) is automatically associated with a location list that is associated with the same location as the location of the task item. Task manager 112 (or a task service in cloud 130) may maintain multiple location lists.

Figure 10A:
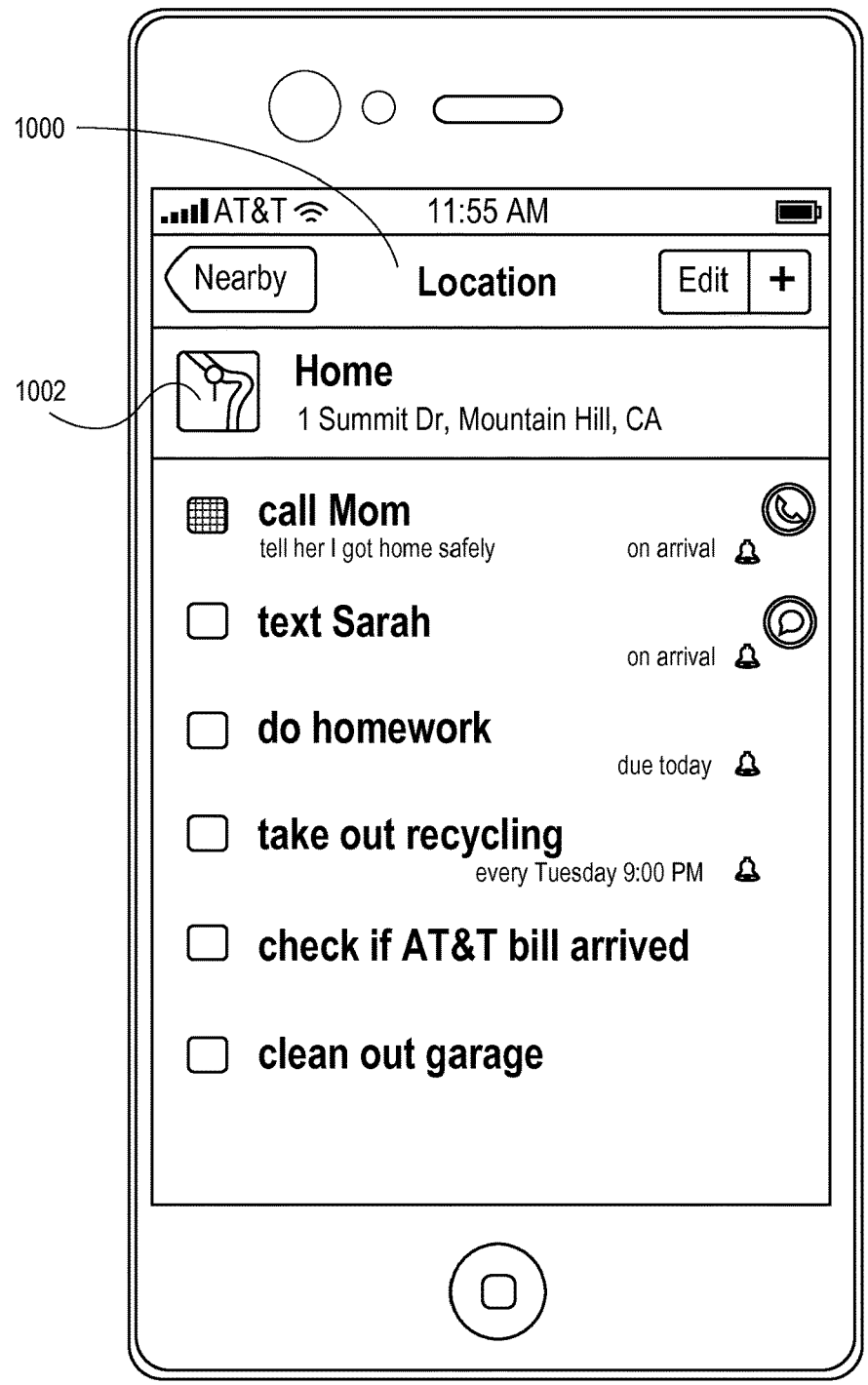

FIG. 10A depicts a Location List view 1000 that device 110 displays. Location list view 1000 may have been generated based on a user selection the "Home" location indicator in Nearby view 900 of FIG. 9. Location list view 1000 contains six task items. The bell image adjacent to each of the first four task items indicates that a reminder (or alert) for those task items will be generated when device 110 is at or near the user's home or at least sometime on a specified date. A reminder or alert will not be generated for the last two task items.

Location List view 1000 also includes a map icon 1002 which, when selected, causes task manager 112 to communicate with a map application that generates a map of the location associated with the map icon. In this example, a map of the user's home would be generated.

Figure 10B:

FIG. 10B depicts a Location List view 1050 that device 110 displays. Location List view 1050 may have been generated based on a user selection the "Whole Foods" location indicator in Nearby view 900 of FIG. 9. Location List view 1050 contains six data items, each of which may or may not be a task item. Instead, each data item in Location List view 1050 simply identifies a grocery item to purchase at a Whole Foods grocery store. None of the grocery items are associated with a reminder (although they could be) or a completion date (although they could be).

The grocery items identified in Location List view 1050 was associated with the Whole Foods grocery list in response to input from a user of device 110. For example, a user spoke the following command: "Add almond milk to my grocery list" or "Remember to pick up almond milk at Whole Foods near my house." Device 110 transmits voice data that reflects this command to NLP service 132. NLP service 132 determines, based on the voice data, that the user intends to purchase almond milk. NLP service 132 may cause task manager 112 to (a) create a task item for the task of purchasing almond milk and add the task item to the Whole Foods list or (b) simply add "almond milk" to the Whole Foods list.

Location List view 1050 also includes a map icon 1052 which, when selected, causes task manager 112 to communicate with a map application that generates a map of the location associated with the map icon. In this example, a map of the Whole Foods store identified by the displayed address would be generated.

Smart Lists

Figure 11A:
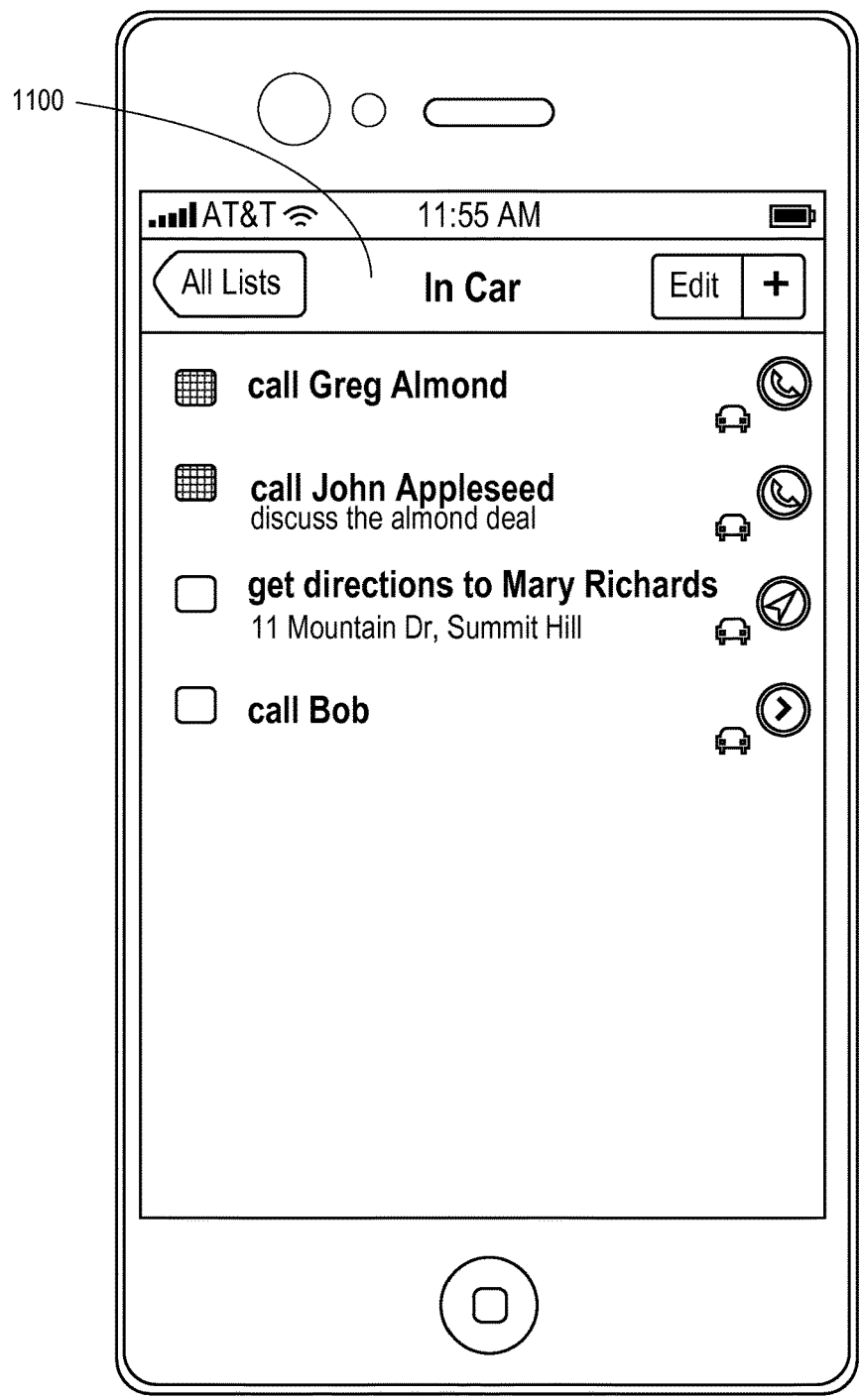
Figure 11B:
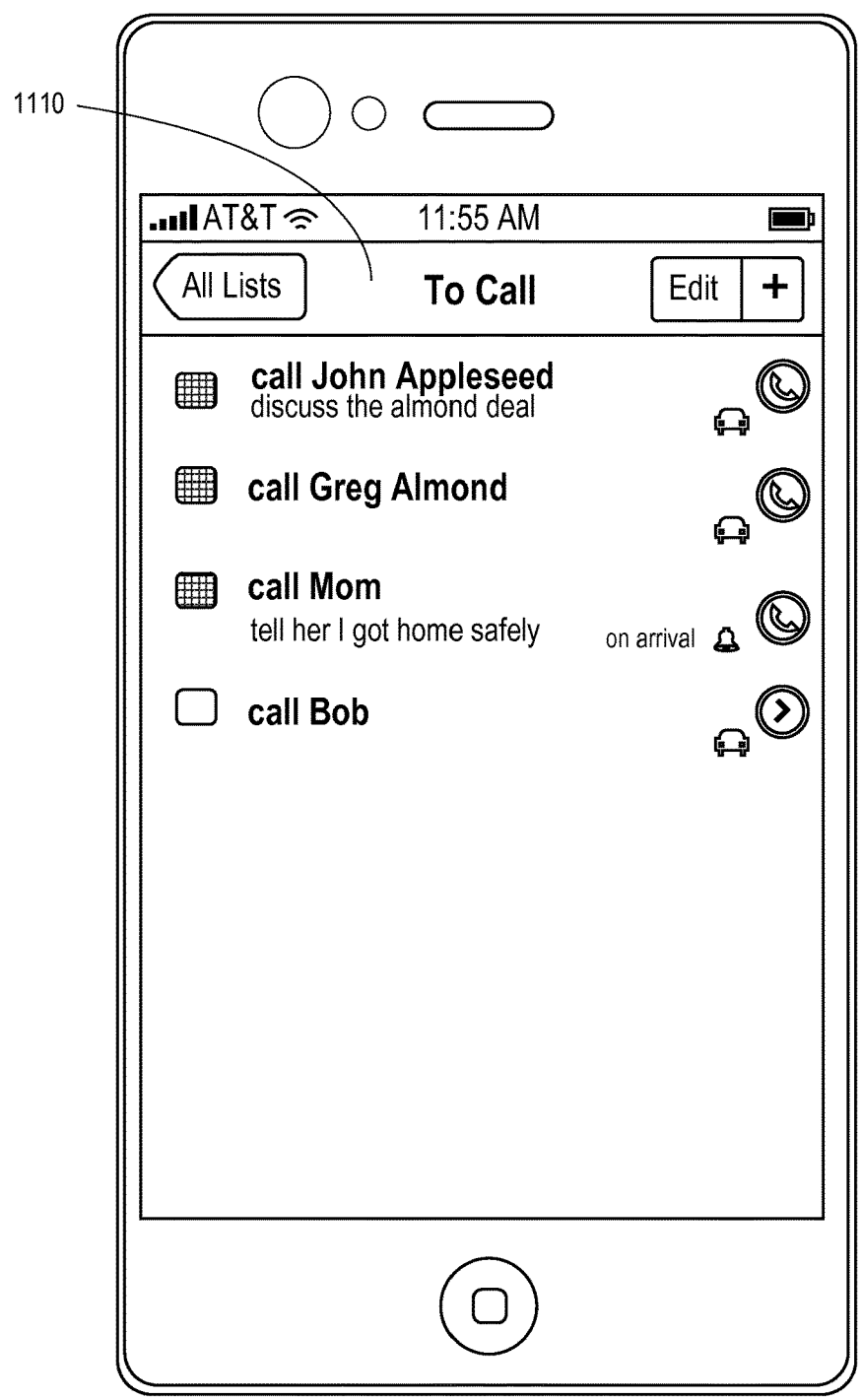
Figure 11C:
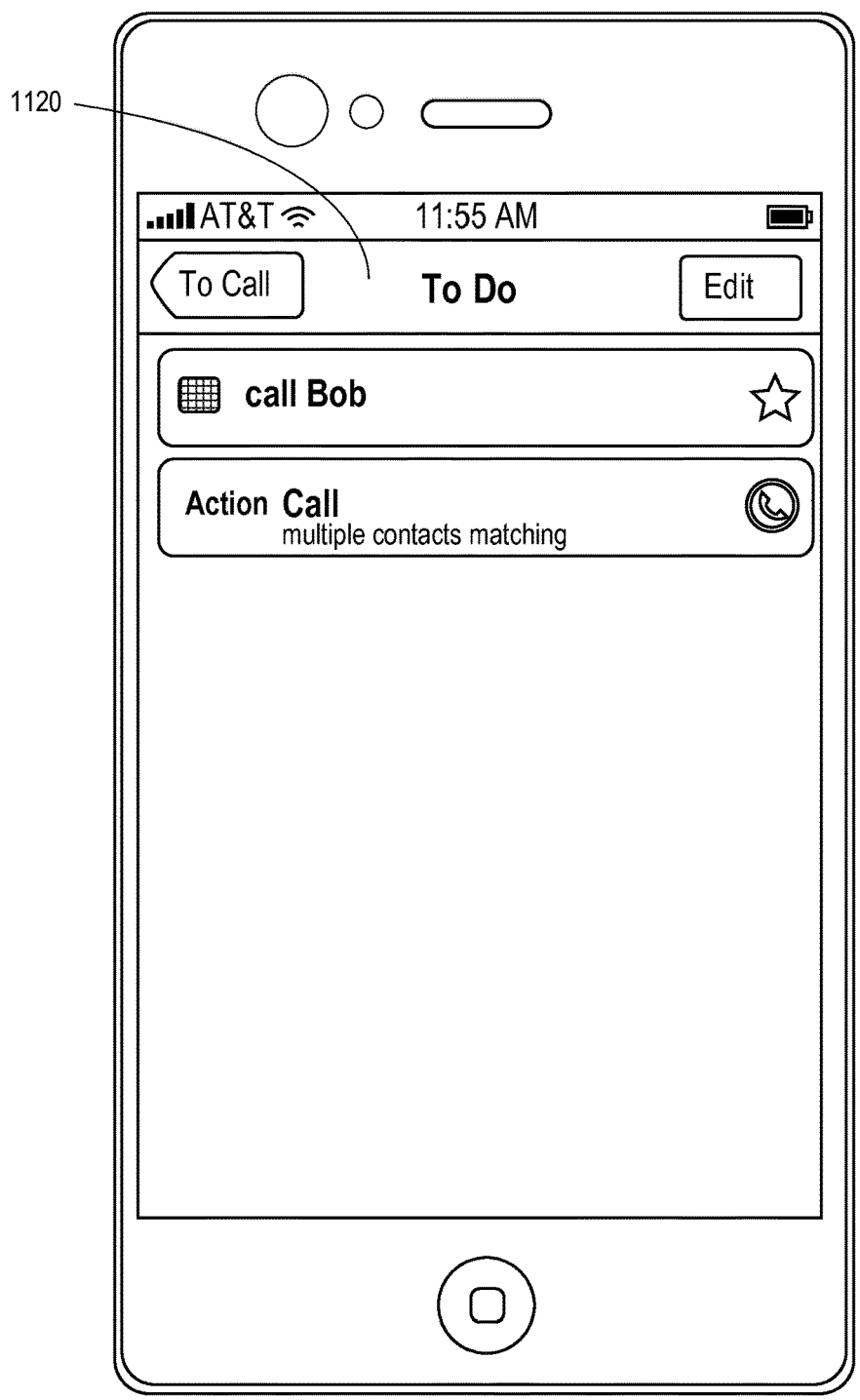
Figure 11D:
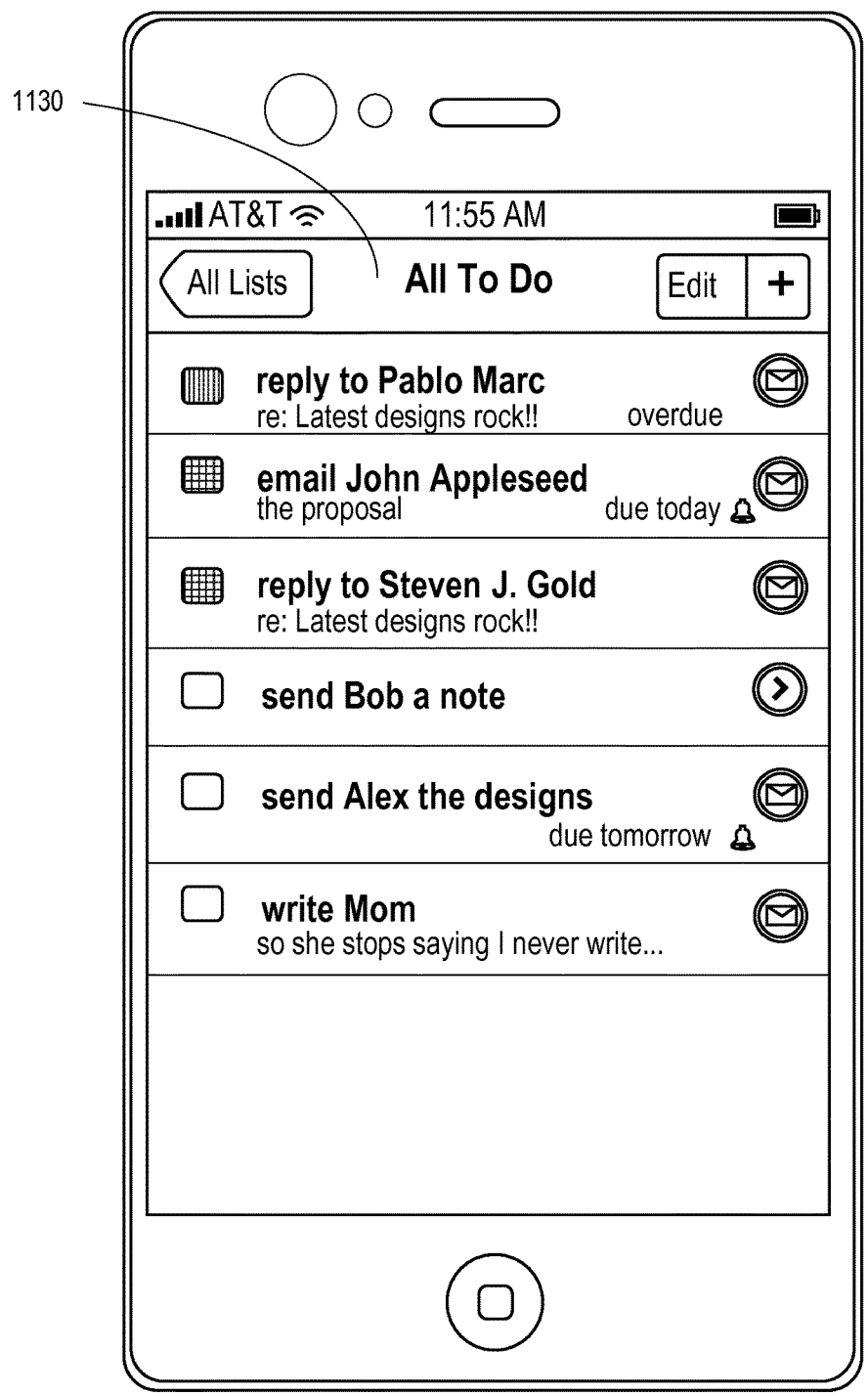

As noted previously, By Location lists, By Action lists, and By Context lists are examples of smart lists. FIG. 11A depicts a view 1100 of a By Context list; specifically, an In Car list. FIG. 11B and FIG. 11D depict views of different By Action lists; specifically, a To Call list and a To Email list.

View 1100 contains task items that are associated with tasks that are to be performed in a specific context, i.e., the "In Car" context. The task items in the In Car list may be associated with different actions, such as calling and getting directions.

In contrast, view 1110, depicted in FIG. 11B, contains task items that are associated with the same action, which, in this example, is to call a person or entity. The first three task items in view 1110 have a phone icon, indicating that a phone number for the person indicated in the corresponding task is known to task manager 112. However, the last task item in view 1110 is not associated with a phone icon, indicating that a phone number for "Bob" is not positively known to task manager 112, probably because many contacts in the user's contact list may have the name of Bob. Selection of the "call Bob" task item in view 1110 causes device 110 to display a view 1120 depicted in FIG. 11C.

View 1120 indicates two data items that are contained in (or associated with) the "call Bob" task item: a description item and an action item. The action item indicates that multiple contacts are known as "Bob." As a result, the action item includes a call button that is disabled, whereas the call buttons associated with the other task items in view 1110 are not disabled. Selection of the action item may initiate a process for disambiguating the identity of "Bob." For example, selection of the action item may cause task manager 112 to display a list of names, each of which have the name of Bob or Robert. In this way, the disambiguation of an identity or of a phone number may occur much later than the creation of the corresponding task item.

View 1130, depicted in FIG. 11D, includes six task items, each of which includes an action to email. The active payload arguments of a To Email task item include a "To" or email address and, optionally, a subject for the subject line of the email.

In an embodiment, an "email" task item is created from an email application that is separate from task manager 112. The email application may invoke an API call of task manager 112 to create a task item whose action is to email, where the action includes an active payload that includes an email address and a subject.

Custom Lists

Figure 12:
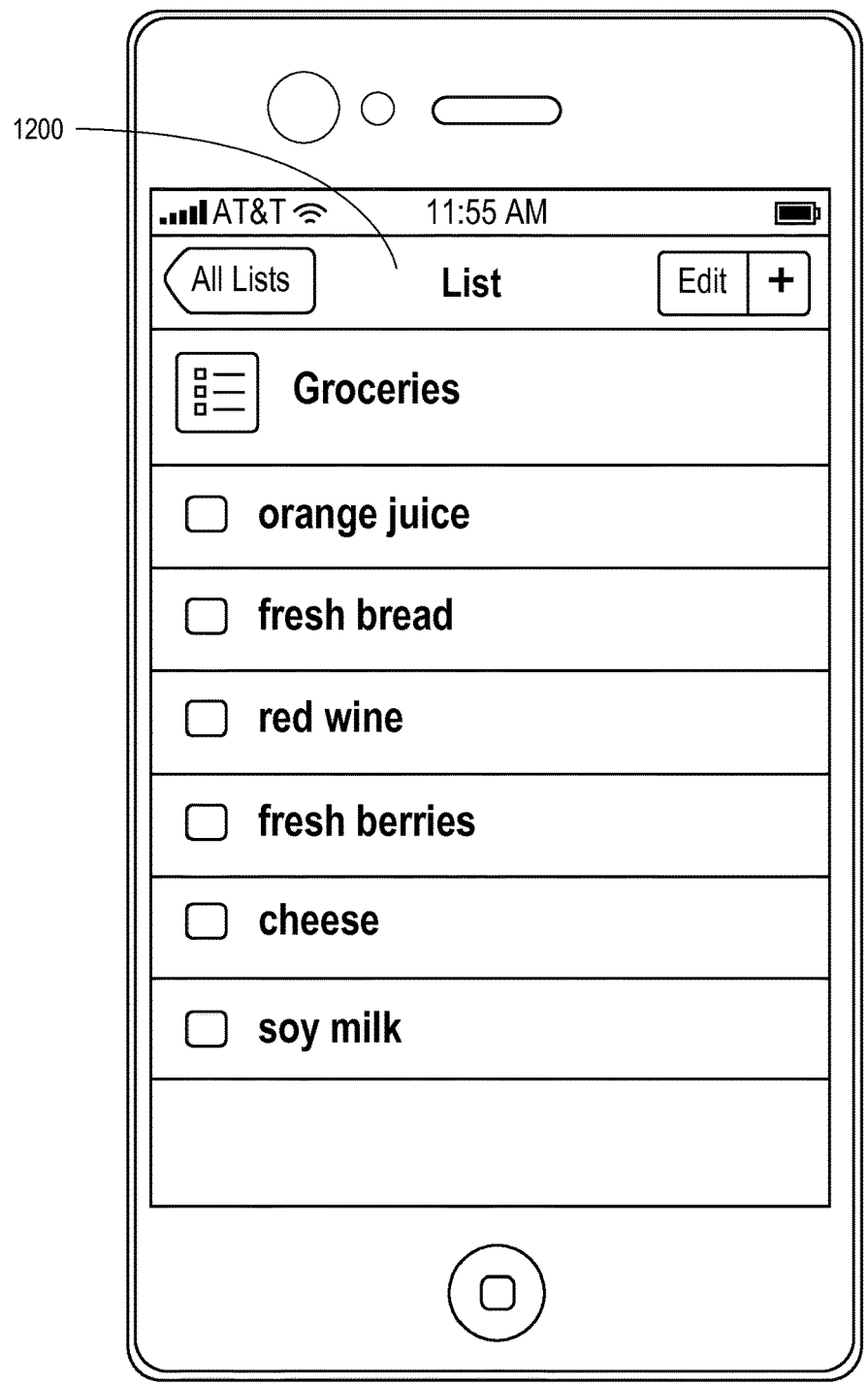

As noted previously, custom lists are one of the three main types of lists, including built-in lists and smart lists. Examples of custom lists indicated above include Grocery list 570 and To Buy list 580 (referenced in FIG. 5A). FIG. 12 depicts a view 1200 that might be generated in response to user selection of Grocery list 570. View 1200 includes six data items, each referring a different grocery item to purchase. Each of these data items may be task items that only have a description. The data items may have been associated with the grocery list based on input from NLP service 132. For example, NLP service receives, from device 110, voice data that reflects the user command to "pick up fresh bread from the store." NLP service 132 determines that the user of device 110 intends to purchase fresh bread from a grocery store and associates "fresh bread" with a grocery category. In response, NLP service 132 sends, to task manager 112, a create task item command to create a task item that includes the description "fresh bread" and that is associated with the grocery category. In response, task manager 112 creates a task item and associates the task item with a grocery list that task manager 112 maintains.

Figure 13:
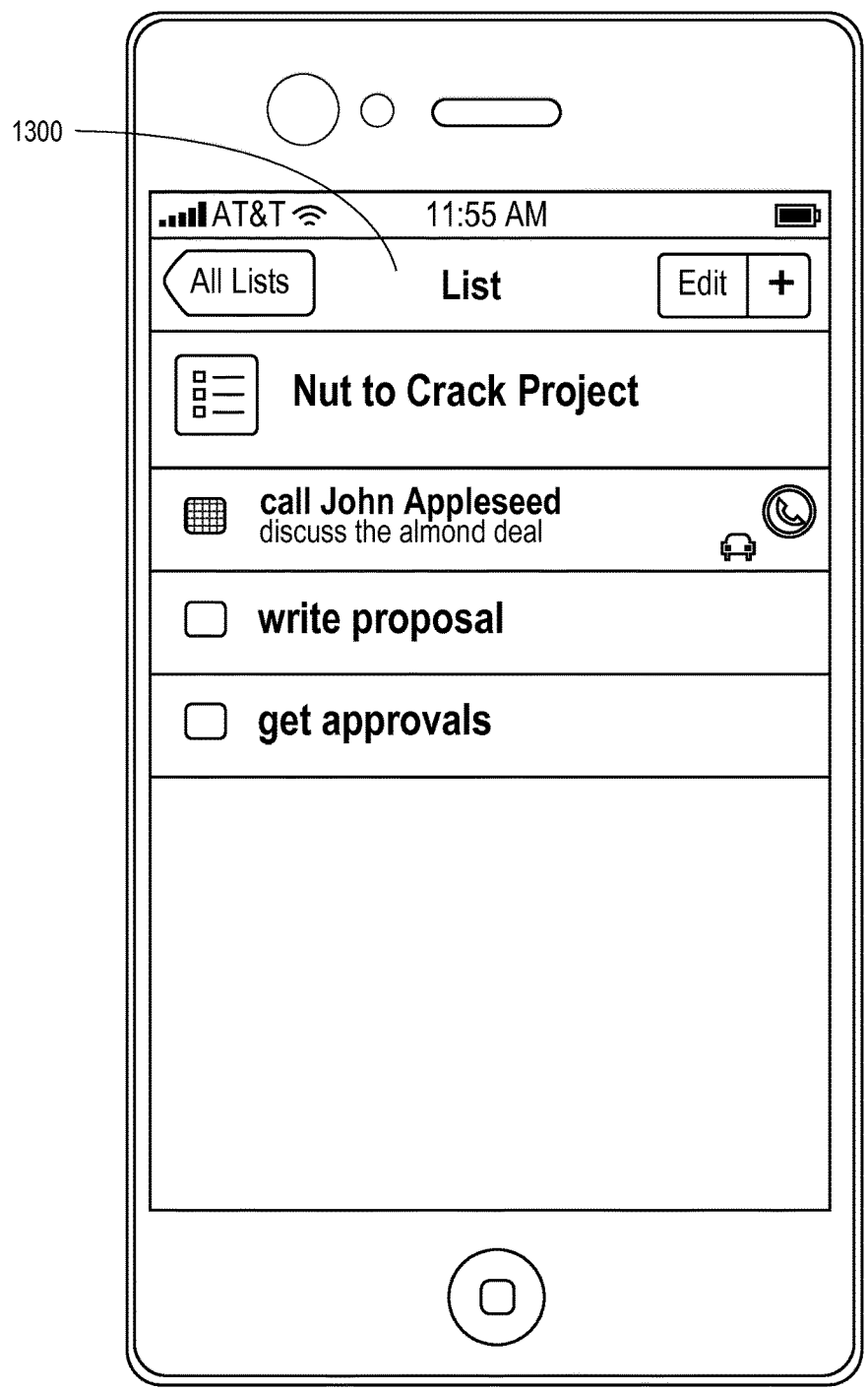

FIG. 13 depicts a view 1300 of another type of custom list: a user-defined list. This user-defined list is entitled, "Nut to Crack Project," and contains three task items, the first of which is associated with an action (i.e., call) and a context trigger (e.g. "in car" or "while driving"). A user of device 110 may "manually" associate a task item with a user-defined list. For example, after task manager 112 creates a task item, the user selects the task item and, via one or more selectable (e.g., menu) options displayed on device 110, selects a particular user-defined list, which causes task manager 112 to associate the task item with the particular user-defined list.

Alternatively, NLP service 132 may determine, based on input data (whether voice or text) received from device 110, a specific list to associate with a task item. For example, voice data may reflect a user command to "I need to write a proposal for the Nut to Crack Project." NLP service 132 determines that "write a proposal" is the task and that "Nut to Crack Project" is the name of a list, which task manager 112 may or may not have yet created. NLP service 132 then sends, to task manager 112, the description ("write proposal") and the name of a possible list to which the to-be-created task item may be added ("Nut to Crack Project"). Task manager 112 determines whether there is a list that has the same or similar name as "Nut to Crack Project." If so, then task manager 112 creates a new task item and associates the task item with that list. If not, then task manager 112 creates a new list with that name, creates a new task item, and associates that task item with the new list.

Lists and Notes

Figure 14:
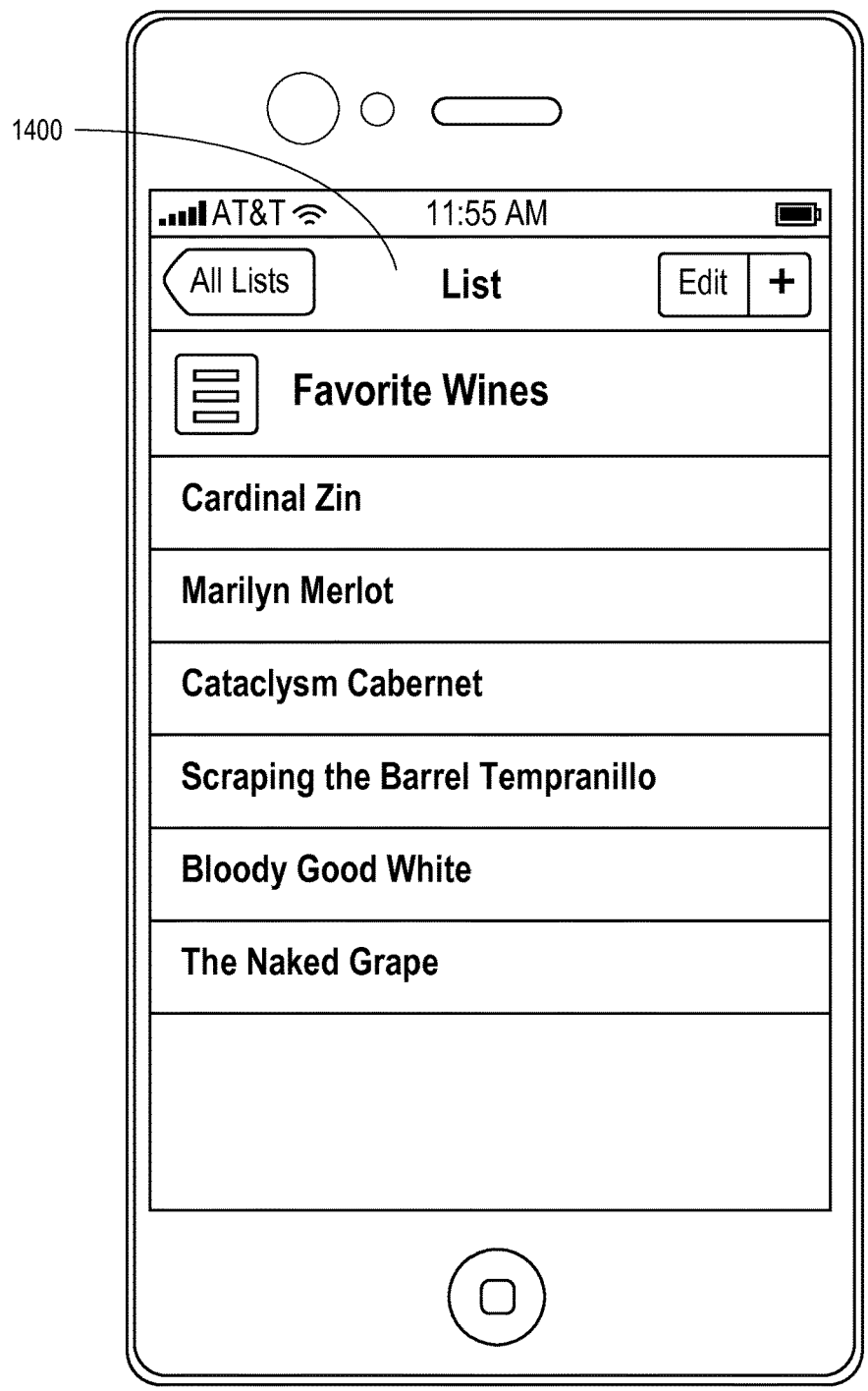

As noted previously, a list may contain items that are not tasks. Such "non-task" are referred to as "notes" that consist only of a description. FIG. 14 depicts a view 1400 of a Favorite Wines list, which contains six notes, each referring to a different wine.

Also as noted previously, NLP service 132 may be configured to recognize list names so that task manager 112 can easily assign tasks and notes to the appropriate list(s).

Calendar Events

In an embodiment, calendar events created in the context of a calendar application are used to create task items that are managed by task manager 112. The calendar application may be part of task manager 112 or may be separately executing applications. For example, the calendar application might be configured to send newly-created calendar events to task manager 112, e.g., via one or more API calls that cause task manager 112 to create a task item based on the details of a calendar event, such as a description, a date, a location (if any), a duration (if any), and a reminder (if any). Alternatively, task manager 112 might provide a calendar service that allows a user to view a calendar and create events that are associated with a specific date and time or set of dates. Upon creation of events, task manager 112 also creates task items for the events.

Figure 15:
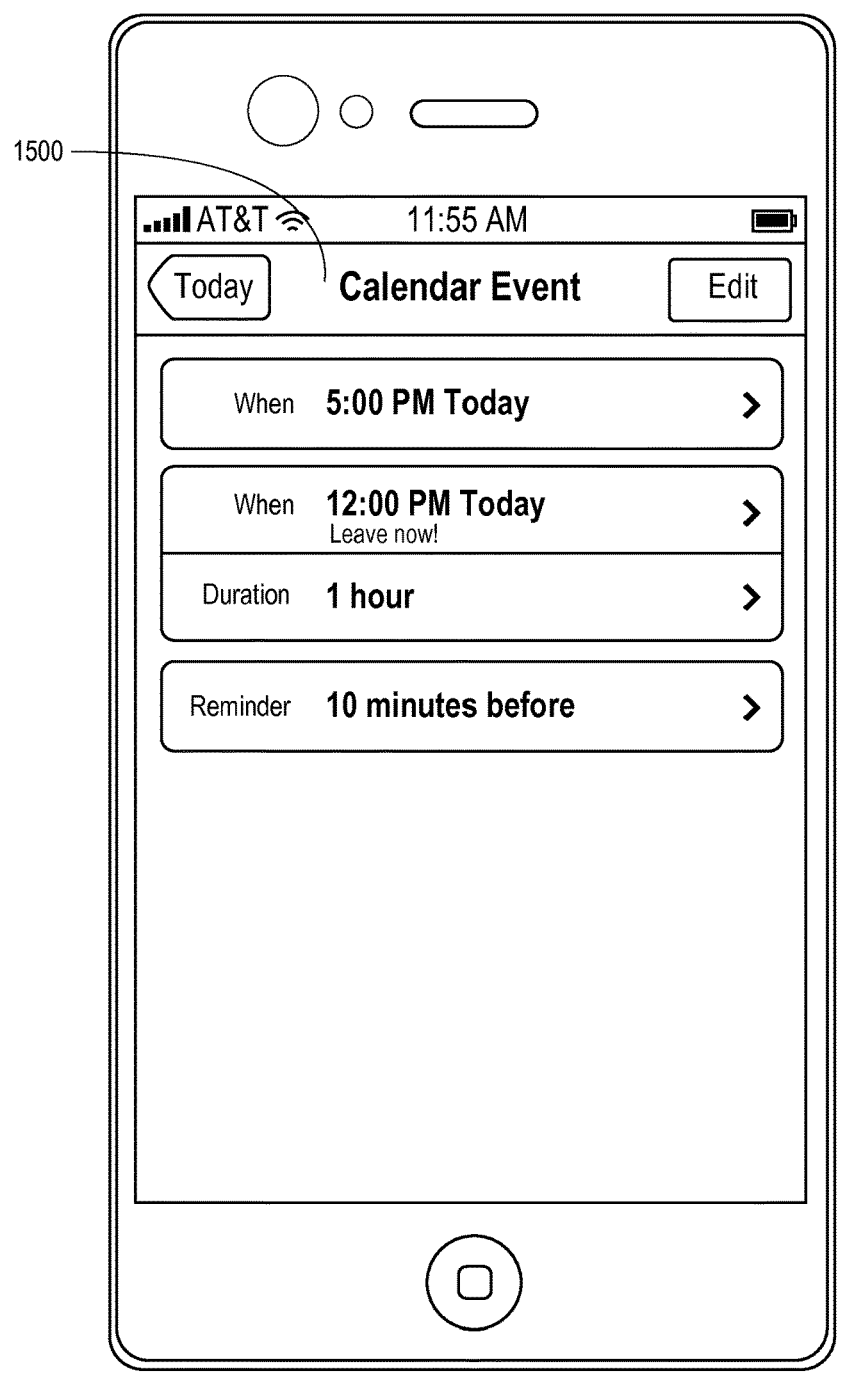

FIG. 15 depicts a view 1500 of a task item that was generated based on a calendar event. The task item includes four data items: a description ("lunch with Elizabeth Reid"), a begin time ("12:00 PM Today"), a duration ("1 hour"), and a reminder ("10 minutes before"). Selection of any of the four data items may allow a user of device 110 to edit the corresponding data items. In an embodiment, if a change is made to a task item that was generated based on a calendar event, then that change is "pushed" to the calendar event that is managed by a calendar application.

In either scenario, if a calendar event that is created and maintained by the calendar service is associated with a location, then a task item that is generated based on the calendar event might also be associated with the location. In that case, task manager 112 might automatically associate the task item with a location list, such as the location list in view 1000 of FIG. 10A.

Combinations

While the foregoing description includes four main approaches (generating task items, organizing task items, triggering notifications, and consuming task items), each of these approaches may be implemented individually or may be used together, as noted in many of the examples. For example, natural language processing may be used to generate a task item, but none of the approaches described herein for processing the task item (i.e., organizing the task item, triggering a notification, and consuming the task item) are used. As another example, natural language processing may be used to generate a task item and an approach for organizing the task item as described herein may be used, but none of the approaches for triggering a notification or consuming the task item described herein are used. As another example, none of the approaches for generating and organizing task items and triggering a notification is used, but the approach for consuming the task item as described herein is used.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
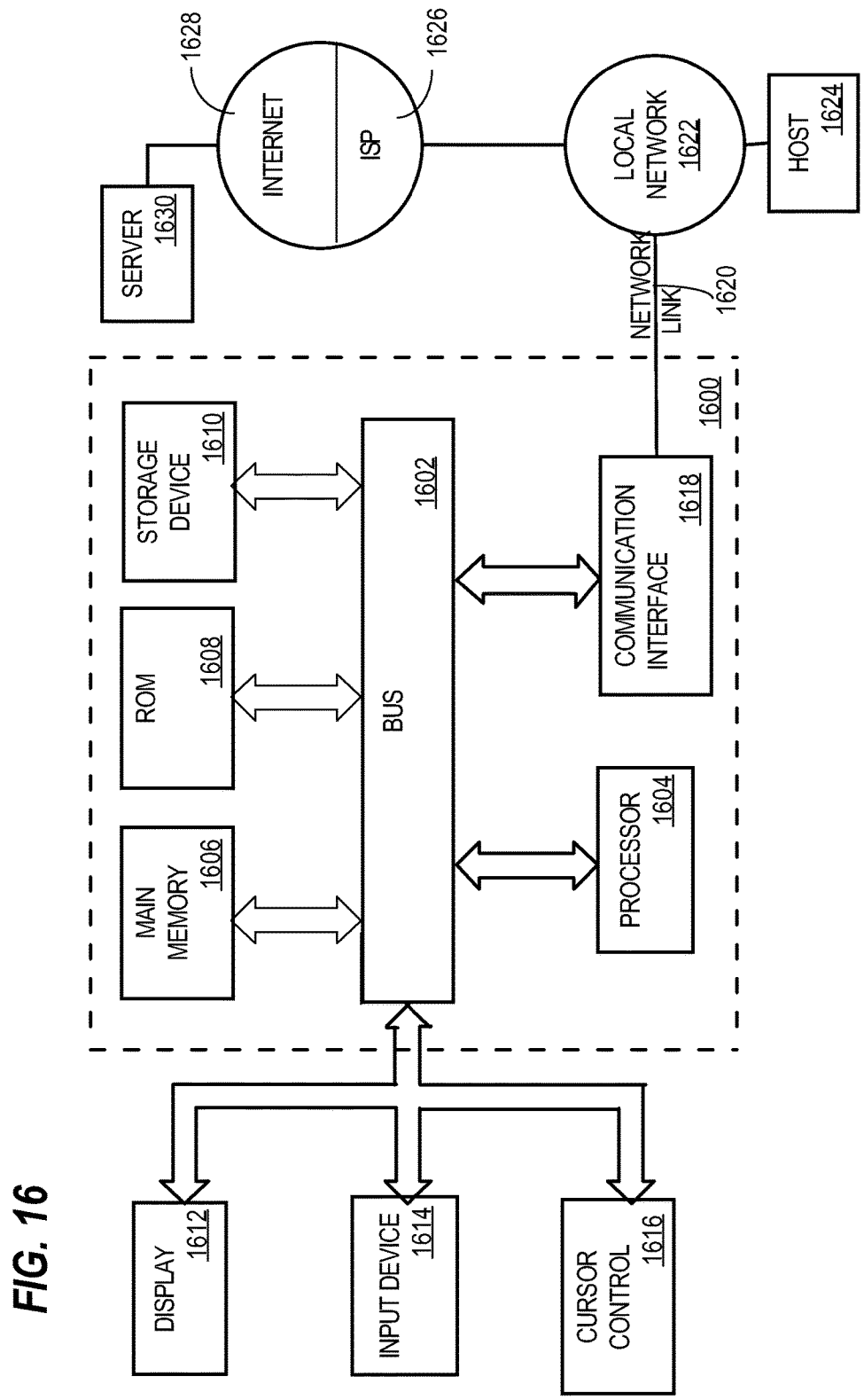
FIG. 16 is a block diagram that illustrates a computer system upon which an embodiment of the invention may be implemented.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    at an electronic device comprising one or more processors and memory storing one or more programs for execution by the one or more processors, the method comprising:
    receiving, from a user, natural language input that expressly specifies one or more first attributes of a task;
    automatically without user intervention, retrieving context data that is separate from the natural language input;
    deriving from the context data one or more second attributes of the task;
    determining, from the natural language input, one or more triggering criteria associated with the task;
    based on the natural language input, generating a task item for the task, the task item including the one or more first attributes, the one or more second attributes, and the one or more triggering criteria:
    determining whether the one or more triggering criteria are satisfied; and,
    in response to determining that the one or more triggering criteria are satisfied, causing a notification associated with the task item to be displayed, the notification including an associated description comprising the one or more first attributes and the one or more second attributes.

2. The method of claim 1, wherein the context data is data that is one of (a) data that is or was displayed by a device, (b) data that is or was processed by the device, (c) location data that indicates a location of the device, (d) data that is stored on the device or in association with the device, or (e) data that is reflected in second input, from the user, that was received at the device prior to receiving said natural language input.

3. The method of claim 1, wherein the context data is data that is or was displayed by the device.

4. The method of claim 2, wherein the context data is data that is or was processed by the device.

5. The method of claim 2, wherein the context data is location data that indicates a location of the device.

6. The method of claim 5, wherein the location of the device is a current location of the device.

7. The method of claim 2, wherein the context data is data that is stored on the device or in association with the device.

8. The method of claim 7, wherein the data includes contact data that indicates a plurality of contacts of the user.

9. The method of claim 1, wherein the context data is data that is reflected in second input, from the user, that was received at the device prior to receiving said natural language input.

10. The method of claim 1,
    wherein deriving the one or more second attributes of the task is performed in response to determining that the one or more triggering criteria are satisfied.

11. The method of claim 1, further comprising:
    receiving second input that expressly specifies one or more attributes of a second task;
    based on the second input, generating a second task item for the second task;
    generating output that prompts the user to provide additional information about the second task;
    after generating the output, receiving third input;
    determining that the third input explicitly indicates at least one attribute of the second task; and
    causing the one or more attributes of the second task and the at least one attribute of the second task to be stored in association with the second task item.

12. A method comprising:
    at an electronic device comprising one or more processors and memory storing one or more programs for execution by the one or more processors, the method comprising:
    receiving input data that is based on natural language input, received at a handheld device, from a user and that expressly specifies one or more first attributes of a task;
    automatically without user intervention, receiving context data that is separate from the input data and that is based on data that is stored at the handheld device;
    deriving from the context data one or more second attributes of the task that are not reflected in the input data;
    determining, from the input data, one or more triggering criteria associated with the task;
    based on the input data causing a task item to be generated for the task, the task item including the one or more first attributes, the one or more second attributes, and the one or more triggering criteria;
    determining whether the one or more triggering criteria are satisfied; and
    in response to determining that the one or more triggering criteria are satisfied, causing a notification associated with the task item to be displayed at the handheld device, the notification including an associated description comprising the one or more first attributes and the one or more second attributes.

13. The method of claim 12, wherein:
the input data is received, over a network, from the handheld device; and the handheld device generates the task item.

14. A non-transitory computer readable storage medium storing one or more programs configured to be executed by a computer system, the one or more programs comprising instructions for:
receiving, from a user, natural language input that expressly specifies one or more first attributes of a task;
automatically Without user intervention, retrieving context data that is separate from the natural language input;
deriving from the context data one or more second attributes of the task;
determining, from the natural language input, one or more triggering criteria associated with the task;
based on the natural language input generating a task item for the task, the task item including the one or more first attributes, the one or more second attributes, and the one or more triggering criteria;
determining whether the one or more triggering criteria are satisfied; and
in response to determining that the one or more triggering criteria are satisfied, causing a notification associated with the task item to be displayed the notification including an associated description comprising the one or more first attributes and the one or more second attributes.

15. The non-transitory computer readable storage medium of claim 14, wherein the context data is data that is one of (a) data that is or was displayed by a device, (b) data that is or was processed by the device, (c) location data that indicates a location of the device, (d) data that is stored on the device or in association with the device, or (e) data that is reflected in second input, from the user, that was received at the device prior to receiving said natural language input.

16. The non-transitory computer readable storage medium of claim 14, wherein the context data is data that is or was displayed by the device.

17. The non-transitory computer readable storage medium of claim 14, wherein the context data is data that is or was processed by the device.

18. The non-transitory computer readable storage medium of claim 14, wherein the context data is location data that indicates a location of the device.

19. The non-transitory computer readable storage medium of claim 18, wherein the location of the device is a current location of the device.

20. The non-transitory computer readable storage medium of claim 14, wherein the context data is data that is stored on the device or in association with the device.

21. The non-transitory computer readable storage medium of claim 14, wherein the data includes contact data that indicates a plurality of contacts of the user.

22. The non-transitory computer readable storage medium of claim 14, wherein the context data is data that is reflected in second input, from the user, that was received at the device prior to receiving said natural language input.

23. The non-transitory computer readable storage medium of claim 14, wherein the instructions further comprise instructions for:
receiving second input that expressly specifies one or more attributes of a second task;
based on the second input, generating a second task item for the second task;
generating output that prompts the user to provide additional information about the second task;
after generating the output, receiving third input;
determining that the third input explicitly indicates at least one attribute of the second task; and
causing the one or more attributes of the second task and the at least one attribute of the second task to be stored in association with the second task item.

24. The method of claim 1, wherein determining the one or more triggering criteria includes determining the one or more triggering criteria from the one or more second attributes.

25. The method of claim 24, wherein:
the one or more second attributes specify a geographic location; and determining whether the one or more triggering criteria are satisfied includes determining whether the device is at or near the geographic location.

26. The method of claim 1, further comprising generating the task item for the task after deriving the one or more second attributes of the task.

27. The method of claim 12, further comprising generating the task item for the task after deriving the one or more second attributes of the task.

28. The non-transitory computer readable storage medium of claim 14, the one ore more programs further comprising instructions for generating the task item for the task after deriving the one or more second attributes of the task.

29. An electronic device comprising one or more processors and memory storing one or more programs for execution by the one or more processors, the one or more programs including instructions for:
receiving, from a user, natural language put that expressly specifies one or more first attributes of a task;
automatically without user intervention, retrieving context data that is separate from the natural language input;
deriving from the context data one or more second attributes of the task;
determining, from the natural language input, one or more triggering criteria associated with the task;
based on the natural language input, generating a task item for the task, the task item including the one or more first attributes, the one or more second attributes, and the one or more triggering criteria;
determining whether the one or more triggering criteria are satisfied; and
in response to determining that the one or more triggering criteria are satisfied, causing a notification associated with the task item to be displayed, the notification including an associated description comprising the one or more first attributes and the one or more second attributes.

30. The electronic device of claim 29, wherein the context data is data that is one of (a) data that is or was displayed by a device, (b) data that is or was processed by the device, (c) location data that indicates a location of the device, (d) data that is stored on the device or in association with the device, or (e) data that is reflected in second input, from the user, that was received at the device prior to receiving said natural language input.

31. The electronic device of claim 30, wherein the data that is stored on the device or in association with the device includes contact data that indicates a plurality of contacts of the user.

32. The electronic device of claim 29, wherein:
determining the one or more second attributes of the task is performed in response to determining that the one or more triggering criteria are satisfied.

33. The electronic device of claim 29, the one or more programs further including instructions for:
receiving second input that expressly specifies one or more attributes of a second task; based on the second input, generating a second task item for the second task; generating output that prompts the user to provide additional information about the second task;
after generating the output, receiving third input;
determining that the third input explicitly indicates at least one attribute of the second task; and
causing the one or more attributes of the second task and the at least one attribute of the second task to be stored in association with the second task item.

34. The electronic device of claim 29, wherein determining the one or more triggering criteria includes determining the one or more triggering criteria from the one or more second attributes.

35. The electronic device of claim 34, wherein:
the one or more second attributes specify a geographic location; and determining whether the one or more triggering criteria are satisfied includes determining whether the device is at or near the geographic location.

* * * * *

UNITED STATES PATENT AND TRADEMARK OFFICE
CERTIFICATE OF CORRECTION

PATENT NO. : 10,255,566 B2
APPLICATION NO. : 13/251088
DATED : April 9, 2019
INVENTOR(S) : Thomas R. Gruber et al.

It is certified that error appears in the above-identified patent and that said Letters Patent is hereby corrected as shown below:

In the Claims

In Column 31, Line 59, Claim 1, delete "criteria:" and insert -- criteria; --, therefor.

In Column 31, Line 61, Claim 1, delete "and," and insert -- and --, therefor.

In Column 32, Line 59, Claim 12, delete "data" and insert -- data, --, therefor.

In Column 33, Line 14, Claim 14, delete "Without" and insert -- without --, therefor.

In Column 33, Line 21, Claim 14, delete "input" and insert -- input, --, therefor.

In Column 33, Line 29, Claim 14, delete "displayed" and insert -- displayed, --, therefor.

In Column 34, Line 28, Claim 28, delete "ore" and insert -- or --, therefor.

In Column 34, Line 35, Claim 29, delete "put" and insert -- input --, therefor.

Signed and Sealed this
Twentieth Day of August, 2019

Andrei Iancu
*Director of the United States Patent and Trademark Office*